(12) United States Patent
Futenma et al.

(10) Patent No.: US 8,565,574 B2
(45) Date of Patent: Oct. 22, 2013

(54) INFORMATION PROCESSING APPARATUS AND METHOD FOR CONTROLLING INPUT AND OUTPUT OPERATIONS ON A BUFFER

(75) Inventors: Satoshi Futenma, Tokyo (JP); Hideki Iwami, Saitama (JP)

(73) Assignee: Sony Corporation, Tokyo (JP)

( * ) Notice: Subject to any disclaimer, the term of this patent is extended or adjusted under 35 U.S.C. 154(b) by 802 days.

(21) Appl. No.: 12/537,699

(22) Filed: Aug. 7, 2009

(65) Prior Publication Data

US 2010/0064091 A1 Mar. 11, 2010

(30) Foreign Application Priority Data

Sep. 11, 2008 (JP) ................................. 2008-233334

(51) Int. Cl.
*H04N 5/765* (2006.01)
*H04N 5/932* (2006.01)

(52) U.S. Cl.
USPC ......................................... 386/200; 386/204

(58) Field of Classification Search
None
See application file for complete search history.

(56) References Cited

U.S. PATENT DOCUMENTS

| 7,398,414 B2 * | 7/2008 | Sherburne, Jr. ............... 713/600 |
| 7,929,560 B2 * | 4/2011 | Morioka ...................... 370/419 |
| 2008/0063078 A1 | 3/2008 | Futenma et al. | |

FOREIGN PATENT DOCUMENTS

| CN | 1665233 A | 9/2005 |
| JP | 61-96846 | 5/1986 |
| JP | 6-52099 | 2/1994 |
| JP | 10-92170 | 4/1998 |
| JP | 2003-8667 | 1/2003 |
| JP | 2003-274216 | 9/2003 |
| JP | 2008-28541 | 2/2008 |
| JP | 2008-42222 | 2/2008 |

OTHER PUBLICATIONS

Chinese Office Action issued on Apr. 14, 2011 in corresponding Chinese Application No. 200910173664.7 (with an English Translation).
Office Action issued May 31, 2012 in Japanese Application No. 2008-233334.

\* cited by examiner

*Primary Examiner* — William C Vaughn, Jr.
*Assistant Examiner* — Oluwaseun A Adegeye
(74) *Attorney, Agent, or Firm* — Oblon, Spivak, McClelland, Maier & Neustadt, L.L.P.

(57) ABSTRACT

An information processing apparatus includes bank overflow flag confirming means for confirming whether a bank overflow flag is set, the bank overflow flag notifying the occurrence of a bank-full state where, in a storage area including plural banks formed therein to store data, not-yet-read data is stored in all the banks, read pointer control means for, upon confirming that the bank overflow flag is set, moving a location designated by a read pointer cyclically designating each of the banks as a bank, from which the data is to be read, to a bank positioned next to a bank at a location designated by a write pointer cyclically designating each of the banks as a bank, into which the data is to be written, and reading means for reading the data from the bank designated by the read pointer after the location designated by the read pointer has been updated.

15 Claims, 24 Drawing Sheets

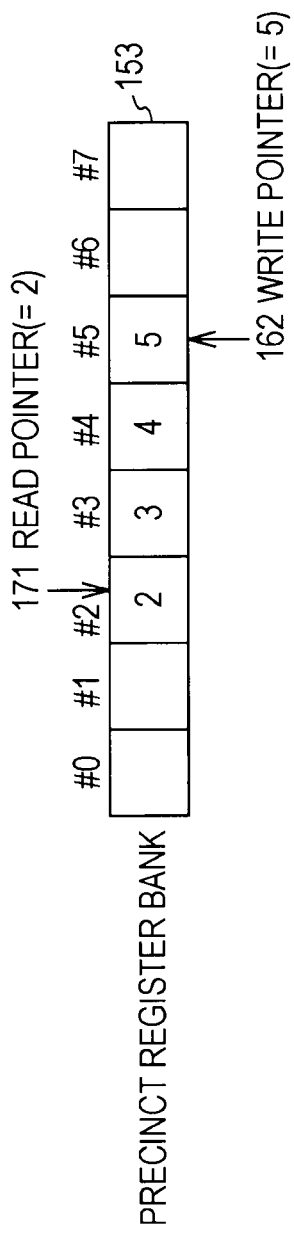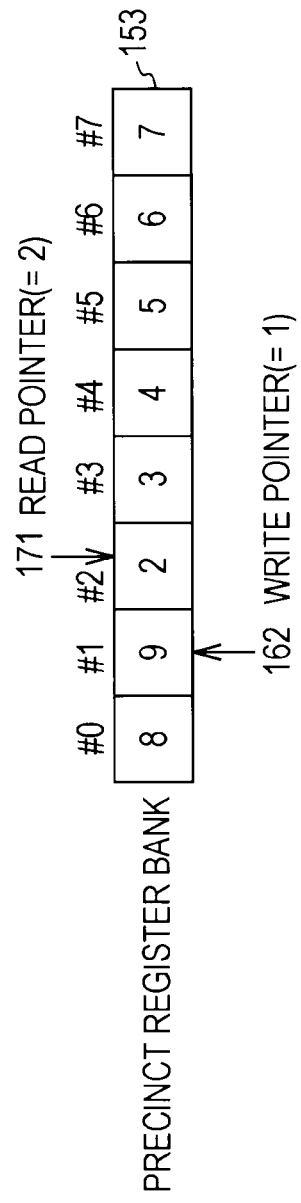

FIG. 12

| UPDATE TIMING OF WRITE POINTER | UPDATE TIMING OF READ POINTER | |
|---|---|---|
| | AT START | AT END |
| AT START | CASE 1 | CASE 2 |
| AT END | CASE 3 | CASE 4 |

INFORMATION PROCESSING APPARATUS AND METHOD FOR CONTROLLING INPUT AND OUTPUT OPERATIONS ON A BUFFER

BACKGROUND OF THE INVENTION

1. Field of the Invention

The present invention relates to an information processing apparatus and method, and more particularly to an information processing apparatus and method, which can more appropriately execute input/output control of a buffer.

2. Description of the Related Art

Hitherto, MPEG-2 (Motion Picture Expert Group) and AVC (Advanced Video Codec) have been practiced as coding methods (called "codec") for realizing a high compression rate based on inter-frame correlation, motion compensation, etc. Those codec techniques are suitable for use in recording data because of a high compression rate, but they generate a delay in units of several frames because the inter-frame correlation or the motion compensation is performed. On the other hand, JPEG (Joint Picture Expert Group), JPEG2000, etc. have been practiced as coding methods (codec) not employing correlation between frames. That type of codec is inferior in compression rate to MPEG-2 and AVC, but it has a feature capable of suppressing a delay to one frame because of a closed compression method within a frame. Accordingly, the latter codec is suitable for use in low-delay communication and is utilized in, e.g., a monitoring camera. Further, codec for compressing data on the line basis has been practiced as a technique providing a lower delay than JPEG and JPEG2000. The term "line-base codec" implies a codec technique of executing compression in units of several lines and outputting compressed data successively instead of executing compression in units of a full one frame.

In the line-base codec, because a compression parameter is determined based on information of several lines without using information of an entire screen, a variation in bit rate per processing unit is increased with respect to a target bit rate (i.e., a compression rate of an image stream). An output of the line-base codec is provided as a VBR (Variable Bit Rate), and when the output is sent via a communication line, the VBR is converted to a CBR (Constant Bit Rate). For that purpose, a code stream and incidental data (encoding parameters) are temporarily buffered in a latter stage of an encoder and are output in match with the situation of a transmission path (see, e.g., Japanese Unexamined Patent Application Publication No. 2008-28541).

In such a buffering process, however, if the situation of the transmission path is not good, outputting of data from the buffer is stopped and is not resumed until the situation of the transmission path returns to a good state. On the other hand, inputting of data to the buffer is continuously performed regardless of the situation of the transmission path. Accordingly, if the situation of the transmission path remains not good, the buffer becomes full of data (namely, a write pointer catches up with a read pointer from the behind), thus causing a bank-full state. In the bank-full state, since not-yet-read data is stored in all banks of the buffer, new data is not normally buffered.

A first conceivable solution to overcome the above-described problem is to, when new data is input in the bank-full state, discard the new data without storing the input data. A second conceivable solution is to, when next data is input in the bank-full state, make all the banks empty and store the supplied data in the emptied banks. A third conceivable solution is to increase the capacity (i.e., the number of banks) of the buffer so that a larger quantity of information can be buffered, thereby avoiding the occurrence of the bank-full state.

SUMMARY OF THE INVENTION

However, the above-described conceivable solutions have the following problems. For example, the first solution accompanies a possibility that old data remaining in the banks becomes too late for the decoding time on the decoder side even if the old data is transmitted later. If the transmitted data is too late for the decoding time, that data is discarded without being decoded. In other words, generally, storing new data having a sufficient margin with respect to the decoding start time provides a higher possibility of increasing a quantity of data subjected to the decoding and is more advantageous in improving quality of a decoded image as compared with the case of continuously holding data not having a sufficient margin with respect to the decoding start time. Therefore, discarding new data as in the first solution increases a possibility that new data and old data are both not decoded on the decoder side. This results in a risk that a not-decoded part of data may be increased to such an extent as deteriorating quality of a decoded image.

The second solution is easy to control, but it accompanies with a risk that, because of discarding a large quantity of data, when data reading is stopped for a very short period, the quality of the decoded image may undesirably deteriorate as a result of undesirably discarding the necessary data. In a wireless environment, particularly, a transmission rate varies to such a large extent that a situation not capable of sending data temporarily occurs very often. Thus, the bank-full state is apt to occur for a very short period.

The third solution accompanies with a risk of increasing a circuit scale and costs because the memory capacity is increased. Also, an increase of the memory capacity (buffer volume) prolongs a delay time in transmission. Accordingly, the third solution may impair the advantage (low delay) of the codec, in particular, the line-base codec, which places top priority to a low delay, when data is buffered in the case of using that type of codec. Further, the stop period of data reading is not constant and greatly differs depending on characteristics of a network used as the transmission path. Stated another way, an optimum value of the buffer volume depends on various conditions, such as the system configuration and transmitted data, and is difficult to specify it. Therefore, the number of banks (buffer volume) is necessarily set based on the worst value so as to prevent the occurrence of the bank-full state. That setting may uselessly increase the memory volume and may increase the costs and the power consumption. It is also conceivable to dynamically change the number of banks. However, such a method makes control complicated and is not easily realized, and further may increase the costs, the power consumption, the processing time, etc.

As described above, the related-art methods have a difficulty in appropriately coping with the bank-full state, and some other more suitable method is demanded in techniques for input/output control of a buffer.

The present invention addresses the above-described problems and is intended to appropriately execute the input and output control of the buffer.

According to one embodiment of the present invention, an information processing apparatus includes bank overflow flag confirming means for confirming whether a bank overflow flag is set, the bank overflow flag notifying occurrence of a bank-full state where, in a storage area including a plurality of banks formed therein to store data, not-yet-read data is stored in all the banks, read pointer control means for, when the bank overflow flag confirming means confirms that the bank overflow flag is set, moving a location designated by a read pointer cyclically designating each of the banks of the storage area as a bank, from which the data is to be read, to a bank positioned next to a bank at a location designated by a write pointer cyclically designating each of the banks of the storage area as a bank, into which the data is to be written, and reading means for reading the data from the bank designated by the read pointer after the location designated by the read pointer has been updated by the read pointer control means.

The information processing apparatus according to the embodiment may further include storage means including the storage area and storing the data in each of the banks, write pointer control means for controlling the write pointer, writing means for writing the data into the bank designated by the write pointer which is controlled by the write pointer control means, and bank overflow flag setting means for setting the bank overflow flag when the not-yet-read data is stored in all the banks of the storage means.

When the write pointer control means updates the write pointer, the write pointer control means may define the location designated by the write pointer such that the bank under the reading by the reading means is not designated.

The information processing apparatus according to the embodiment may further include bank overflow flag clearing means for clearing the bank overflow flag set by the bank overflow flag setting means, the setting of the bank overflow flag being confirmed by the bank overflow flag confirming means.

The write pointer control means may update the write pointer before the writing performed by the writing means, and the read pointer control means may update the read pointer after the reading performed by the reading means.

The write pointer control means may update the write pointer before the writing performed by the writing means, and the read pointer control means may update the read pointer before the reading performed by the reading means.

The write pointer control means may update the write pointer after the writing performed by the writing means, and the read pointer control means may update the read pointer before the reading performed by the reading means.

The write pointer control means may update the write pointer after the writing performed by the writing means, and the read pointer control means may update the read pointer after the reading performed by the reading means.

The information processing apparatus according to the embodiment may further include writing flag setting means for setting a writing flag indicating the data being under writing during a period in which the writing means is writing the data.

The information processing apparatus according to the embodiment may further include reading flag setting means for setting a reading flag indicating the data being under reading during a period in which the reading means is reading the data.

The data may include attribute information indicating attributes of encoded data per encoding unit at which image data is encoded.

The attribute information may be added with address information of the storage area in which the encoded data is held.

According to another embodiment of the present invention, an information processing method for use in an information processing apparatus includes the steps of confirming whether a bank overflow flag is set, the bank overflow flag notifying occurrence of a bank-full state where, in a storage area including a plurality of banks formed therein to store data, not-yet-read data is stored in all the banks, upon confirming that the bank overflow flag is set, moving a location designated by a read pointer cyclically designating each of the banks of the storage area as a bank, from which the data is to be read, to a bank positioned next to a bank at a location designated by a write pointer cyclically designating each of the banks of the storage area as a bank, into which the data is to be written, and reading the data from the bank designated by the read pointer after the location designated by the read pointer has been updated.

With the embodiments of the present invention, it is confirmed whether the bank overflow flag is set. The bank overflow flag notifies the occurrence of the bank-full state where, in the storage area including the plurality of banks formed therein to store data, not-yet-read data is stored in all the banks. When it is confirmed that the bank overflow flag is set, the location designated by the read pointer cyclically designating each of the banks of the storage area as a bank, from which the data is to be read, is moved to a bank positioned next to the bank at the location designated by the write pointer cyclically designating each of the banks of the storage area as a bank, into which the data is to be written. The data is read from the bank designated by the read pointer after the location designated by the read pointer has been updated.

The embodiments of the present invention enable information to be appropriately processed. In particular, the embodiments of the present invention enable input/output control of a buffer to be more appropriately processed.

BRIEF DESCRIPTION OF THE DRAWINGS

FIGS. 8A and 8B are explanatory views to explain the occurrence of a bank overflow;

FIG. 12 is a table to explain patterns of update timings of the pointers;

DESCRIPTION OF THE PREFERRED EMBODIMENTS

Figure 1:
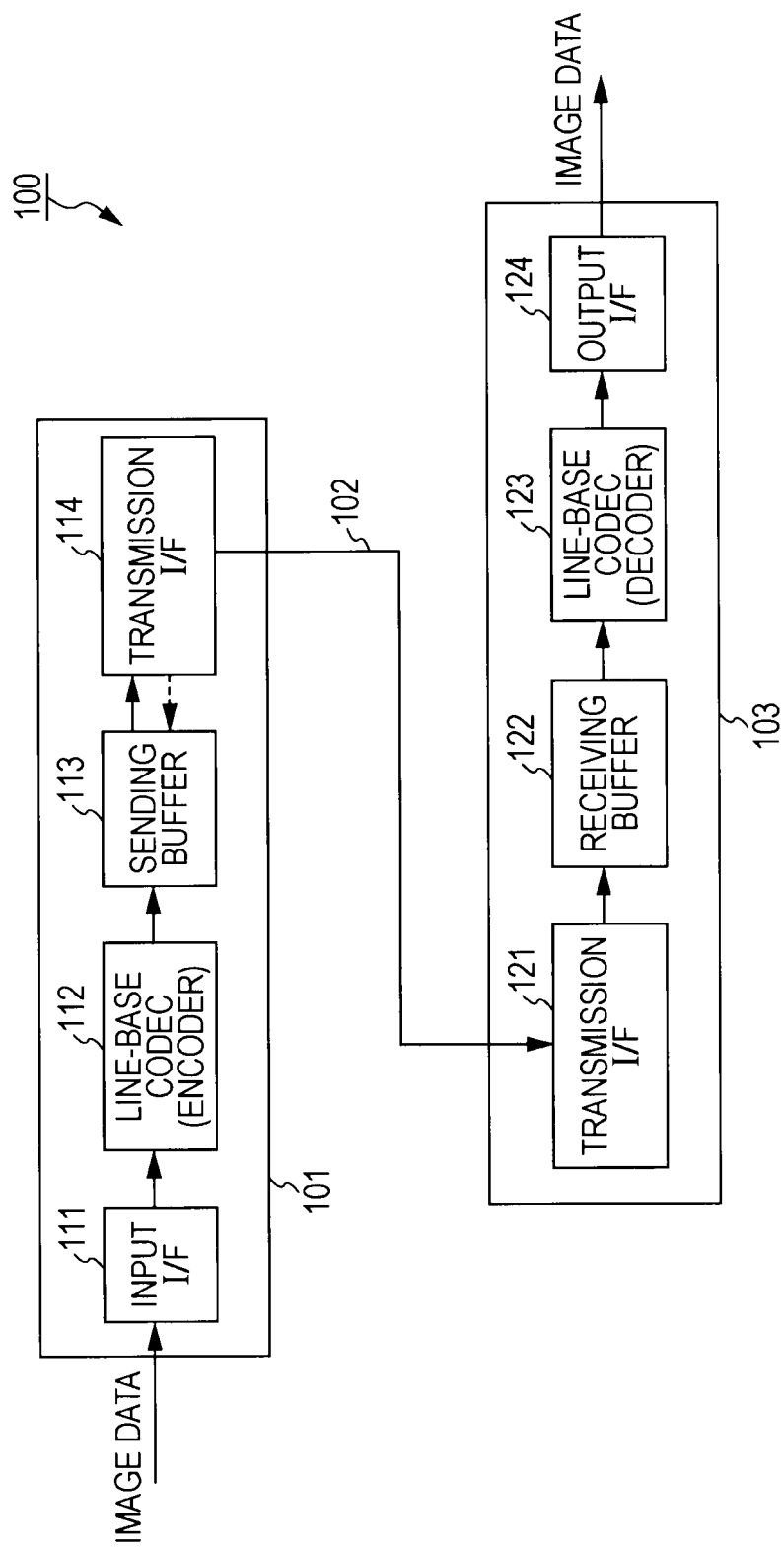
FIG. 1 is a block diagram illustrating an example of configuration of an information processing system in which the present invention is embodied.

FIG. 1 is a block diagram illustrating an example of configuration of an information processing system in which the present invention is embodied. An information processing system 100, illustrated in FIG. 1, is a system for transmitting image data.

The information processing system 100 includes a sending apparatus 101 and a receiving apparatus 103 which are interconnected via a transmission path 102. The sending apparatus 101 transmits image data to the receiving apparatus 103 via the transmission path 102.

The sending apparatus 101 encodes input image data and sends the encoded data to the receiving apparatus 103 via the transmission path 102. The sending apparatus 101 includes an input interface (I/F) 111, a line-base codec encoder 112, a sending buffer 113, and a transmission interface (I/F) 114.

The input interface 111 accepts image data input to the sending apparatus 101 from the exterior and supplies the input image data to the line-base codec encoder 112. The line-base codec encoder 112 encodes the input image data per several lines, for example, and supplies the encoded data to the sending buffer 113.

The sending buffer 113 temporarily holds the encoded data (image data) supplied to it. The transmission interface 114 reads the encoded data, which is held in the sending buffer 113, at a predetermined bit rate and outputs the read-out encoded data to the transmission path 102 after conversion to the form of a packet.

The encoded data sent from the sending apparatus 101 is supplied to the receiving apparatus 103 via the transmission path 102. The receiving apparatus 103 decodes the encoded data supplied from the sending apparatus 101 and outputs the decoded image data. The receiving apparatus 103 includes a transmission interface (I/F) 121, a receiving buffer 122, a line-base codec decoder 123, and an output interface (I/F) 124.

The transmission interface 121 receives the packet of the encoded data supplied through the transmission path 102, extracts the encoded data from the received packet, and supplies the extracted encoded data to the receiving buffer 122. The receiving buffer 122 temporarily holds the received encoded data. The line-base codec decoder 123 obtains the encoded data, which is held in the receiving buffer 122, in units of a predetermined quantity and decodes the obtained decoded data to produce image data of several lines. The output interface 124 outputs, to the exterior of the receiving apparatus 103, image data (decoded image data) which has been produced by the line-base codec decoder 123 through decoding of the encoded data.

In such a system, the line-base codec encoder 112 of the sending apparatus 101 executes the encoding at a VBR (Variable Bit Rate). On the other hand, the transmission interface 114 sends the encoded data at a bit rate independent of the bit rate in the encoding.

For example, the transmission interface 114 basically converts the encoded data to the form of a packet in units of a predetermined data quantity and sends the encoded data at a CBR (Constant Bit Rate). However, for example, when a network serving as the transmission path 102 is shared by other systems, i.e., when data other than the relevant encoded data is also transmitted via the transmission path 102, a band width usable in the transmission path 102 for transmitting the encoded data is not constant. Therefore, the transmission interface 114 sends the encoded data while adjusting the bit rate in match with the band width usable in the transmission path 102.

To accommodate such a difference in bit rate between the encoding and the sending, the sending buffer 113 temporarily holds the encoded data and incidental data (such as encoding parameters).

At that time, the sending buffer 113 executes data input/output control in a more appropriate manner. For example, when a bank-full state occurs in the sending buffer 113, the sending buffer 113 appropriately controls a data storage location and a data read position. Such control executed by the sending buffer 113 reduces deterioration in quality of the decoded image, which is obtained with the decoding process in the receiving apparatus 103, as compared with the image before the encoding. Further, the sending buffer 113 executes the data input/output control in an easier way, thus realizing suppression of an increase in costs, a circuit scale (memory capacity), and a delay time, for example. A concrete control method will be described later.

The transmission of the image data will be described in more detail below. A line-base codec, i.e., a codec for realizing cutting of a delay time in the data transmission, is first described.

Wavelet conversion is employed in the line-based codec for encoding image data per line or plural lines of a frame image in the image data. In discrete wavelet conversion, generally, an original image is divided by one-dimensional wavelet convolution, which is executed on each horizontal pixel row, into two sub-images, i.e., a sub-image including lower-frequency information and a sub-image including higher-frequency information. Each sub-image is divided by similar wavelet convolution, which is executed on each vertical pixel column, into two sub-images, i.e., a sub-image including lower-frequency information and a sub-image including higher-frequency information.

Figure 2:
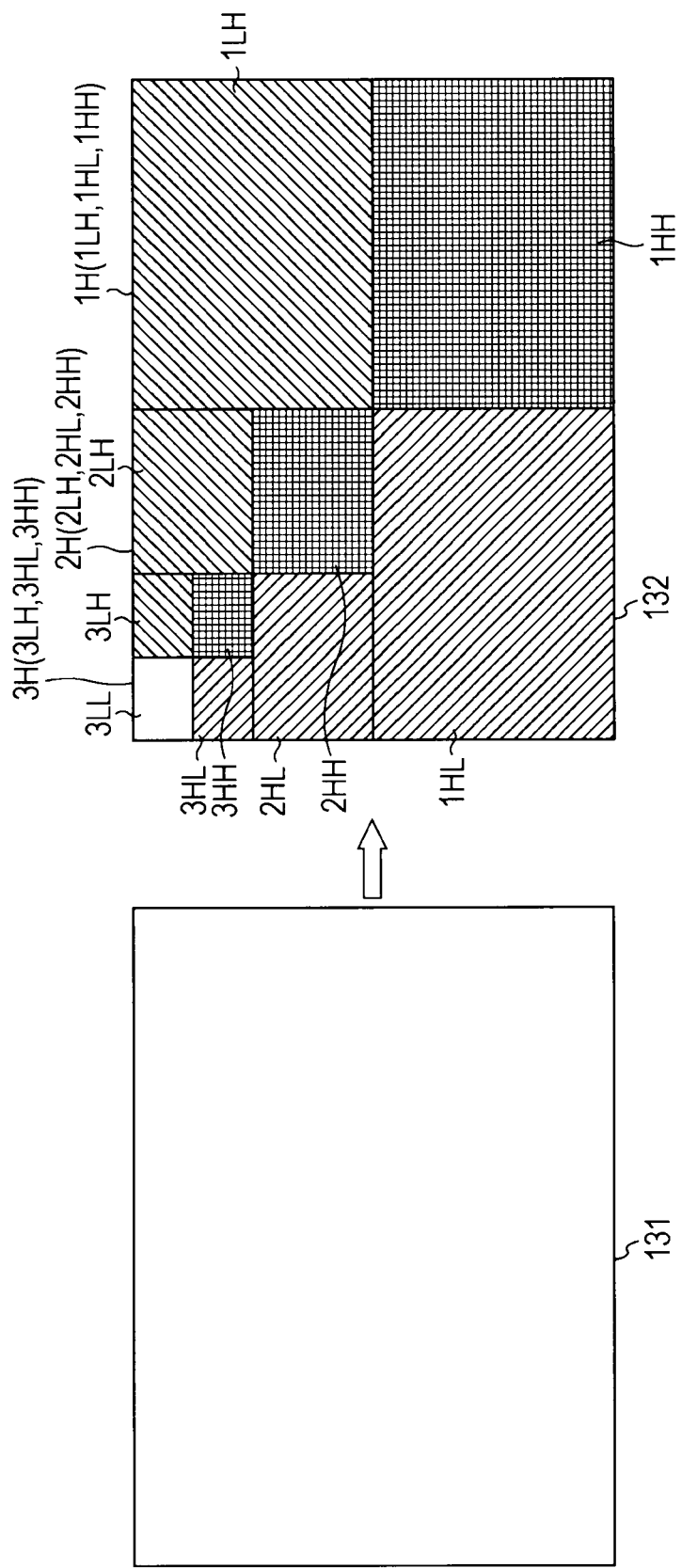
FIG. 2 is an explanatory view to explain a process of line-base wavelet conversion.

More specifically, a base band signal 131 of one frame, illustrated in FIG. 2, is decomposed to four sub-bands, i.e., sub-images (HH, HL, LH and LL), as denoted by a post-conversion signal 132. The sub-image LL represents a component having lower frequency in each of the vertical and horizontal directions. The sub-image LH represents a component having lower frequency in the horizontal direction and having higher frequency in the vertical direction. The sub-image HL represents a component having higher frequency in the horizontal direction and having lower frequency in the vertical direction. The sub-image HH represents a component having higher frequency in each of the horizontal direction and the vertical direction. Each of the sub-images has a ¼ size of the original image and includes ¼ of the number of data points in the original image.

Such wavelet conversion is repeatedly executed on the obtained sub-image LL. It is assumed, in FIG. 2, that the sub-images obtained at a first decomposition level through the wavelet conversion of the original image are 1HH, 1HL, 1LH and 1LL (not shown), for example. In that case, the wavelet conversion is further executed on the sub-image 1LL for division into four sub-images 2HH, 2HL, 2LH and 2LL (not shown) at a second decomposition level. Moreover, the wavelet conversion is executed on the sub-image 2LL for division into four sub-images 3HH, 3HL, 3LH and 3LL (not shown) at a third decomposition level. Thus, the wavelet conversion is repeatedly executed such that the sub-images form a hierarchical structure in the post-conversion signal 132.

By recurrently repeating the wavelet conversion of the lower-frequency component, as described above, data in a lower spatial frequency band is gradually narrowed into a smaller area so that compression encoding can be executed with higher efficiency.

In the line-base codec, a processing unit for the encoding is not an entire image, but it is one line or plural lines. Thus, in the line-base codec, the wavelet conversion is also executed per line or plural lines.

Figure 3:
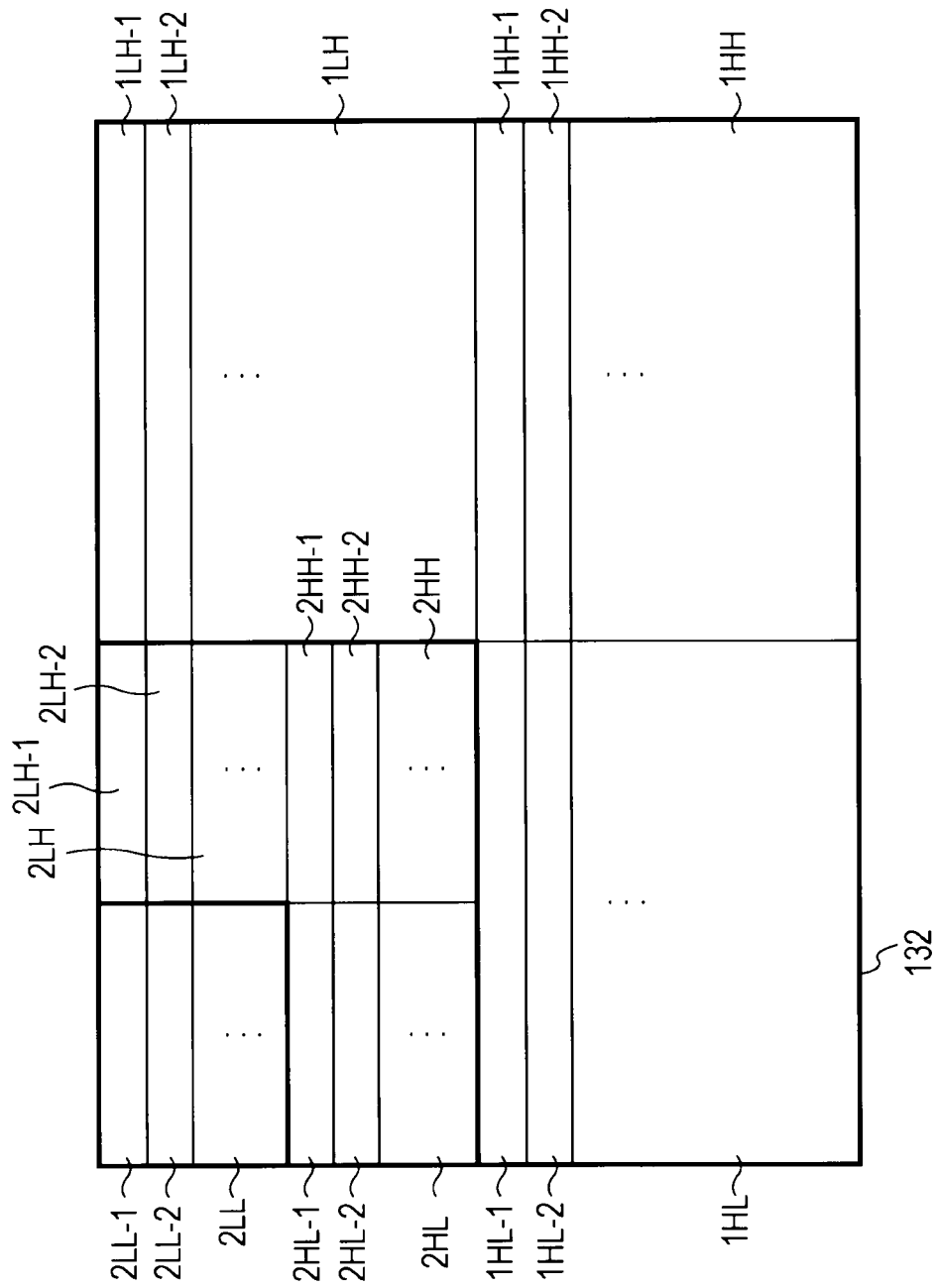
FIG. 3 is an explanatory view to explain one example of the process of the line-base wavelet conversion.

For example, as denoted by the post-conversion signal 132 illustrated in FIG. 3, lines corresponding to part of a baseband image are subjected to the wavelet conversion, whereby 1LL-1 (not shown), 1LH-1, 1HL-1, and 1HH-1 are produced. Further, 1LL-1 is subjected to the wavelet conversion, whereby 2LL-1, 2LH-1, 2HL-1, and 2HH-1 are produced. After the part of the image is subjected to the wavelet conversion a predetermined number of times as described above, lines corresponding to next part of the image are similarly subjected to the wavelet conversion, whereby 1LL-2 (not shown), 1LH-2, 1HL-2, and 1HH-2 are produced. Further, 1LL-2 is subjected to the wavelet conversion, whereby 2LL-2, 2LH-2, 2HL-2, and 2HH-2 are produced.

In such a manner, the wavelet conversion is executed per predetermined number of lines. Image data resulting from the wavelet conversion (i.e., wavelet coefficient data) are successively encoded. In other words, encoding is executed per predetermined number of lines. Thus, by encoding the image data per encoding unit that is smaller than the frame image, the line-base codec can reduce a delay time attributable to the encoding and decoding, thus realizing cutting of a delay time in the data transmission.

Figure 4:
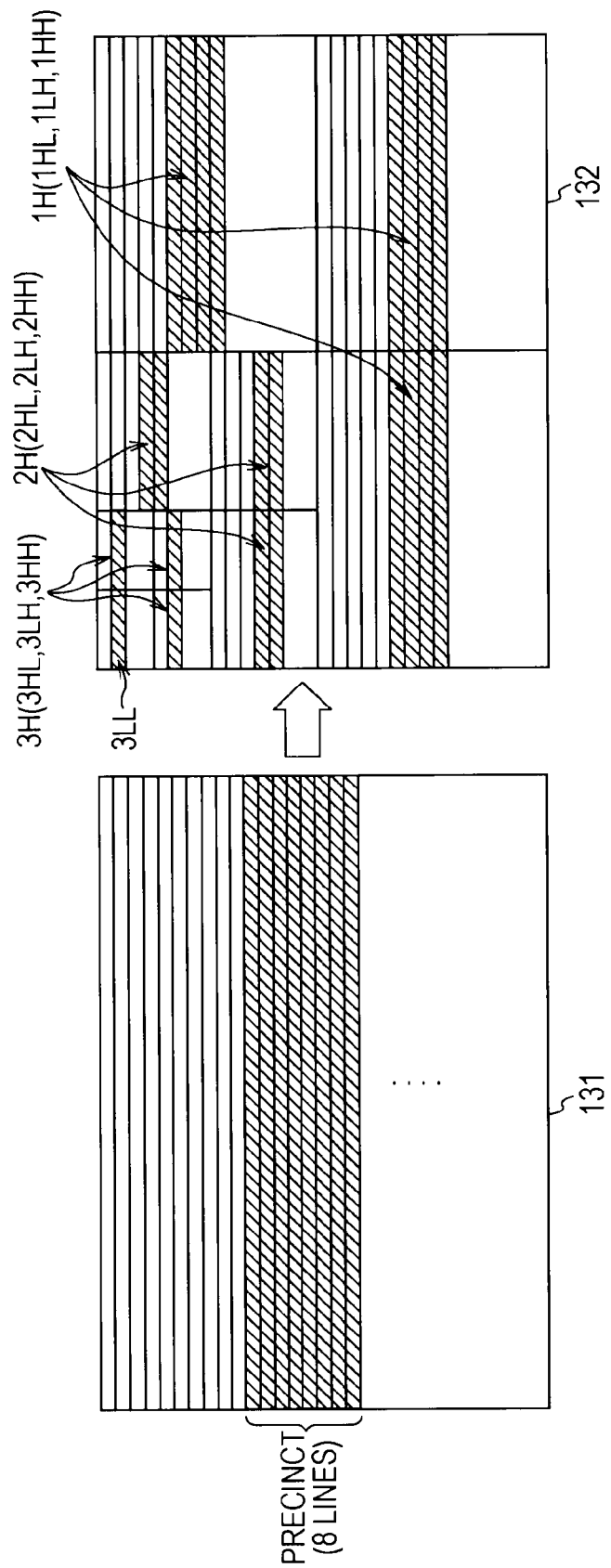
FIG. 4 is an explanatory view to explain another example of the process of the line-based wavelet conversion.

For example, when the wavelet conversion is executed per eight base-band lines in the vertical direction as illustrated in FIG. 4, one line of sub-image 3LL in the lowest frequency range, i.e., at the most significant level, is produced corresponding to the eight base-band lines in the case of triple wavelet decompositions. Further, sub-bands 3H (3HL, 3LH and 3HH) at the next level are produced as one line per sub-band. Sub-bands 2H (2HL, 2LH and 2HH) at the still next level are produced as two lines per sub-band. Sub-bands 1H (1HL, 1LH and 1HH) in the highest frequency range are produced as four lines per sub-band.

A set of base-band pixel data, which is necessary for producing one line of coefficient data for the lowest frequency sub-band "LL" at the most significant level, is called "precinct (or line block)". In some cases, the term "precinct" also implies a set of coefficient data for all the sub-bands (i.e., a set of aligning units), which are obtained by executing the wavelet conversion of pixel data corresponding to one precinct. That set of coefficient data is substantially identical to the set of base-band pixel data, which is necessary for producing one line of coefficient data for the lowest frequency sub-band "LL" at the most significant level.

Be it noted that the number of lines in one precinct is not necessarily kept the same for each precinct within a picture.

The line-base wavelet conversion is executed per processing unit provided by the precinct. For example, a precinct (hatched in FIG. 4) corresponding to 8 lines in the base band signal 131, illustrated on the left side of FIG. 4, is constituted by, as illustrated on the right side of FIG. 4, four lines (hatched in FIG. 4) for each of 1HL, 1LH and 1HH at 1H of the post-conversion signal 132 resulting from the line-base wavelet conversion, two lines (hatched in FIG. 4) for each of 2HL, 2LH and 2HH at 2H, and one line (hatched in FIG. 4) for each of 3LL, 3HL, 3LH and 3HH.

By utilizing the line-base wavelet conversion process described above, a lower delay in the data transmission can be achieved. The line-base wavelet conversion is featured in that, since division is performed on wavelet coefficients instead of the base band signal 131 unlike tile division in JPEG2000, deterioration in image quality due to block noise is not generated at tile boundaries.

Figure 5:
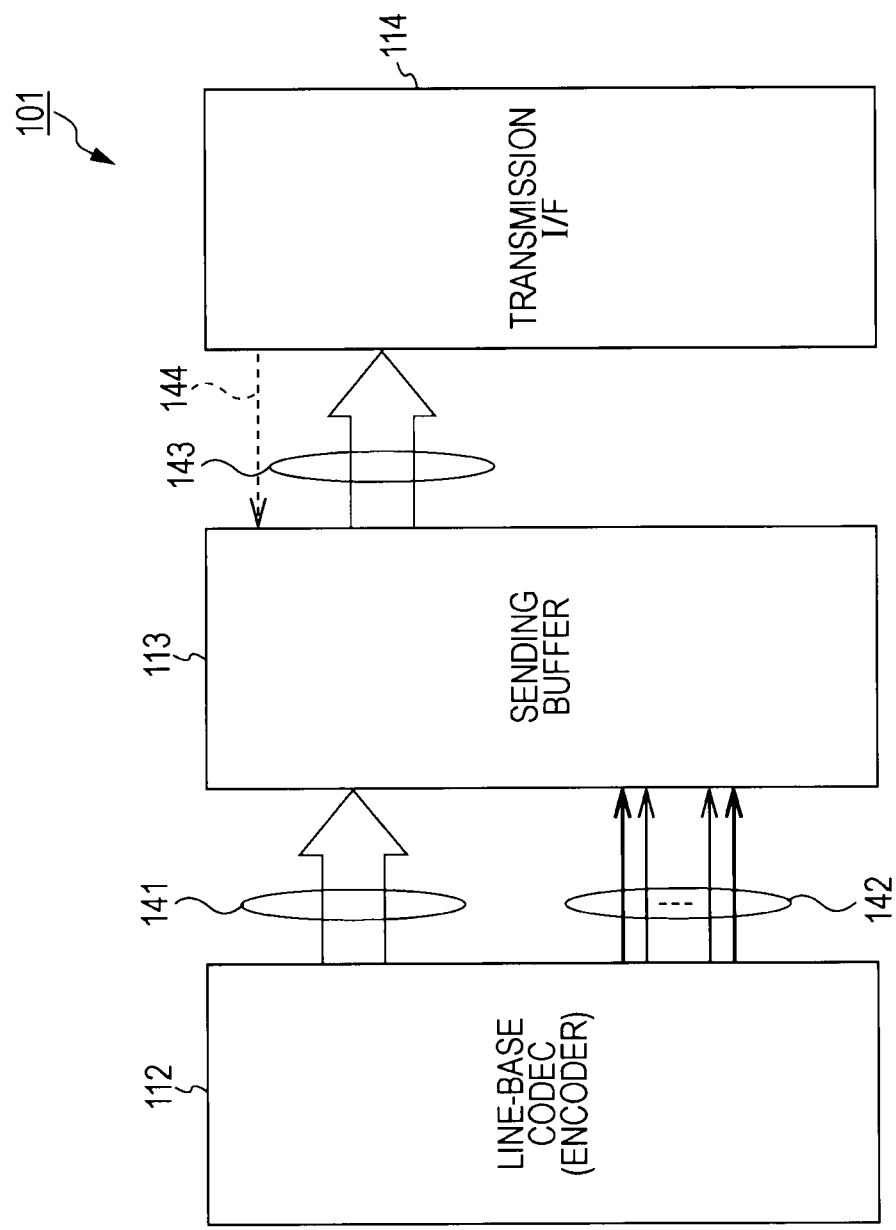
FIG. 5 is an explanatory view to explain an input/output interface of a sending buffer.

The detailed configuration of the sending apparatus 101 will be described below. FIG. 5 is an explanatory view to explain an input/output interface of the sending buffer 113. As illustrated in FIG. 5, the sending buffer 113 temporarily holds the data supplied from the line-base codec encoder 112 and outputs the supplied data to the transmission interface 114.

The line-base codec encoder 112 supplies, to the sending buffer 113, a data signal 141 including the encoded data per precinct (hereinafter also referred to as "precinct data") and a data attribute signal 142 including precinct attribute information (Precinct Info) that corresponds to the data signal 141. The precinct attribute information is information indicating the setting and the contents of the precinct data and is produced per precinct. The precinct attribute information contains, for example, information indicating the position of the relevant precinct within an image (e.g., the identification number (Precinct ID)), the data size of the precinct data, the quantization parameters used in the encoding, and component information of the image. Of course, the precinct attribute information may further contain other information than the examples stated above.

In the sending buffer 113, a header for transmission (i.e., a precinct header) is produced based on the precinct attribute information supplied as the data attribute signal 142. The transmission header is added to the head of the precinct data. The precinct data added with the transmission header is output in the form of a transmission packet 143 (precinct header+data) to the transmission interface 114. The transmission interface 114 sends the transmission packet 143, supplied from the sending buffer 113, to the transmission path 102 (FIG. 1). Also, when the transmission path 102 comes into a state not capable of temporarily transmitting the packet, the transmission interface 114 supplies an output stop signal (Stop Signal) 144 to the sending buffer 113 to stop the outputting from the sending buffer 113. For example, when the encoded data is transmitted to the receiving apparatus 103 via a wireless line (i.e., when the transmission path 102 is a wireless line), a state not capable of transmitting radio waves may occur due to interference. In such a case, the transmission interface 114 supplies the output stop signal 144 to the sending buffer 113 to stop the data supply from the sending buffer 113 so that the data will not overflow.

The sending buffer 113 temporarily holds the encoded data in order to accommodate the above-mentioned difference between the bit rate in the encoding and the bit rate in the transmission (i.e., variations in the bit rate during the encoding and the transmission). At that time, the sending buffer 113 executes data input/output control in such an appropriate manner that deterioration in quality of a decoded image can be suppressed without increasing the circuit scale, the costs, and the delay time, for example.

While the data signal 141 and the data attribute signal 142 are illustrated in FIG. 5 as being supplied from the line-base codec encoder 112 to the sending buffer 113 via different buses, practical embodiments of the present invention are not limited to the illustrated arrangement. The data signal 141 and the data attribute signal 142 may be supplied to the sending buffer 113 via common buses. Also, the number of buses for transmitting each of the data signal 141 and the data attribute signal 142 can be optionally set. The data signal 141 and the data attribute signal 142 may be each transmitted via a single bus or a plurality of buses. The number of buses for transmitting the data signal 141 and the number of busses for transmitting the data attribute signal 142 may differ from each other. As still another modification, the transmission rate may be set different between the bus for transmitting the data signal 141 and the bus for transmitting the data attribute signal 142.

Similarly, the number of buses for transmitting the transmission packet 143, the number of buses for transmitting the output stop signal 144, and respective transmission rates in those buses can also be optionally set. Further, the transmission packet 143 and the output stop signal 144 may be sent and received via common buses.

Figure 6:
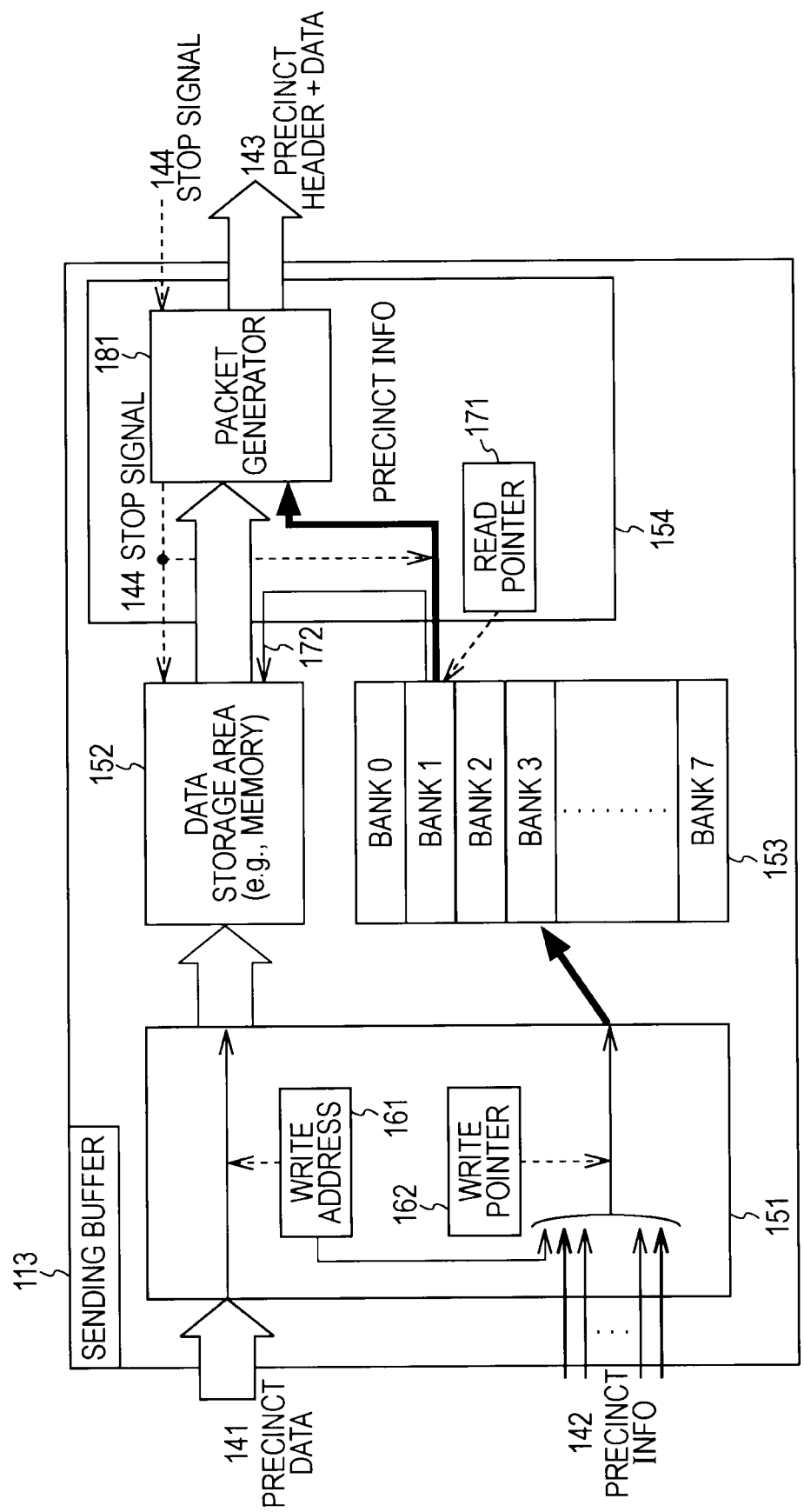
FIG. 6 is a block diagram illustrating an example of internal configuration of the sending buffer.

An example of detailed configuration of the sending buffer 113 will be described below. FIG. 6 is a block diagram illustrating an example of internal configuration of the sending buffer 113. As illustrated in FIG. 6, the sending buffer 113 includes a write controller 151, a data storage area (e.g., a memory) 152, a precinct attribute information storage area (Precinct Register Bank) 153, and a read controller 154.

The write controller 151 supplies the precinct data, which is supplied thereto as the data signal 141 from the line-base codec encoder 112, to the data storage area 152 to be stored therein. Also, the write controller 151 defines a write address 161, i.e., a storage destination address of the precinct data. The write controller 151 stores the supplied precinct data in the data storage area 152 at the defined write address.

Further, the write controller 151 supplies the precinct attribute information (Precinct Info), which is supplied there to as the data attribute signal 142 from the line-base codec encoder 112, to the precinct attribute information storage area (Precinct Register Bank) 153 to be stored therein. At that time, the write controller 151 adds the storage destination address of the precinct data, which corresponds to the supplied precinct attribute information, to the relevant precinct attribute information for supply to the precinct attribute information storage area 153 to be stored therein.

The precinct attribute information storage area 153 has a plurality of areas (banks) each formed therein to store one set of precinct attribute information (including the storage destination address of the precinct data) at one time. In the case illustrated in FIG. 6, eight banks of "Bank 0" to "Bank 7" are formed in the precinct attribute information storage area 153.

The write controller 151 sets a write pointer 162, i.e., information for designating a bank in which the precinct attribute information is to be stored. In other words, the write controller 151 sets the write pointer 162 for selecting one of the plurality of banks (eight banks in the case of FIG. 6) formed in the precinct attribute information storage area 153, and for designating the selected bank.

While a method of selecting the bank can be optionally set, it is general to cyclically select the banks one by one in a predetermined sequence. In the case of FIG. 6, for example, the write controller 151 updates the value of the write pointer 162 such that the eight banks are designated one by one in the sequence of "Bank 0", "Bank 1", "Bank, 2", etc. After setting the write pointer 162 so as to designate the eighth bank "Bank 7", the write controller 151 returns to the beginning in the next setting and sets the write pointer 162 so as to designate the first bank "Bank 0" again. Thus, the write controller 151 makes setting such that the write pointer 162 repeatedly designates the eight banks of "Bank 0" to "Bank 7" in the predetermined sequence. As a matter of course, the sequence in designating the selected bank can be optionally set and may be changed even during the processing if the sequence is correctly managed.

The data storage area 152 is a memory area formed of, for example, a semiconductor memory or a hard disk. The data storage area 152 stores the precinct data, which is supplied from the write controller 151, at the address designated by the write address 161, thus temporarily holding the precinct data.

The precinct attribute information storage area 153 is also a memory area formed of, for example, a semiconductor memory or a hard disk. The precinct attribute information storage area 153 stores the precinct attribute information, which is supplied from the write controller 151, in the bank designated by the write controller 151, thus temporarily holding the precinct attribute information.

The read controller 154 reads the precinct attribute information (including the storage destination address of the precinct data) from the precinct attribute information storage area 153. Also, the read controller 154 sets a read pointer 171 for designating the bank from which the precinct attribute information is to be read, and further reads the precinct attribute information (including the storage destination address of the precinct data) from the bank indicated by the read pointer 171.

As with the write pointer 162, a method of setting the read pointer 171 can be optionally set. For example, the read controller 154 sets the read pointer 171 so as to cyclically select the banks one by one in a predetermined sequence.

In the case of FIG. 6, for example, the read controller 154 updates the value of the read pointer 171 such that the eight banks are designated one by one in the sequence of "Bank 0", "Bank 1", "Bank 2", etc. After setting the read pointer 171 so as to designate the eighth bank "Bank 7", the read controller 154 returns to the beginning in the next setting and sets the read pointer 171 so as to designate the first bank "Bank 0" again. Thus, the read controller 154 makes setting such that the read pointer 171 repeatedly designates the eight banks of "Bank 0" to "Bank 7" in the predetermined sequence. As a matter of course, the sequence in designating the selected bank can be optionally set and may be changed even during the processing if the sequence is correctly managed.

The precinct attribute information read by the read controller 154 is added with the storage destination address of the precinct data (i.e., the write address 161). The read controller 154 reads the precinct data by using the added address (i.e., the write address 161) as a read address 172. Stated another way, the read controller 154 accesses the write address 161 (i.e., the read address 172) in the data storage area 152, which is added to the precinct attribute information, and reads the precinct data from that address. In such a manner, the read controller 154 can read, from the data storage area 152, the precinct data in the same precinct as that denoted by the precinct attribute information which has been read from the precinct attribute information storage area 153.

The read controller 154 has a packet generator 181 for converting the precinct data to the form of a packet. The read controller 154 supplies, to the packet generator 181, both the precinct attribute information read from the precinct attribute information storage area 153 and the precinct data read from the data storage area 152. The packet generator 181 generates a precinct header from the precinct attribute information and converts the precinct data to the form of a packet. Further, the read controller 154 supplies the generated transmission packet 143 to the transmission interface 114.

When the transmission path 102 comes into a state not capable of transmitting the transmission packet 143 for some reason, the transmission interface 114 supplies the output stop signal (Stop Signal) 144 to the read controller 154. Upon receiving the output stop signal 144, the packet generator 181 stops the generation of the packet. In response to the output stop signal 144, the read controller 154 stops the reading of the precinct attribute information and the precinct data. When the transmission path 102 comes into a state capable of transmitting the transmission packet 143 and the supply of the output stop signal 144 is stopped, the read controller 154 resumes the reading of the precinct attribute information and the precinct data. In response to the resumption of the reading, the packet generator 181 resumes the generation of the packet.

The read controller 154 operates independently of the write controller 151. More specifically, the processes in the read controller 154, such as the reading of the precinct attribute information from the precinct attribute information storage area 153, the reading of the precinct data from the data storage area 152, and the generation of the packet, are executed independently of the writing process in the write controller 151.

Figure 7:
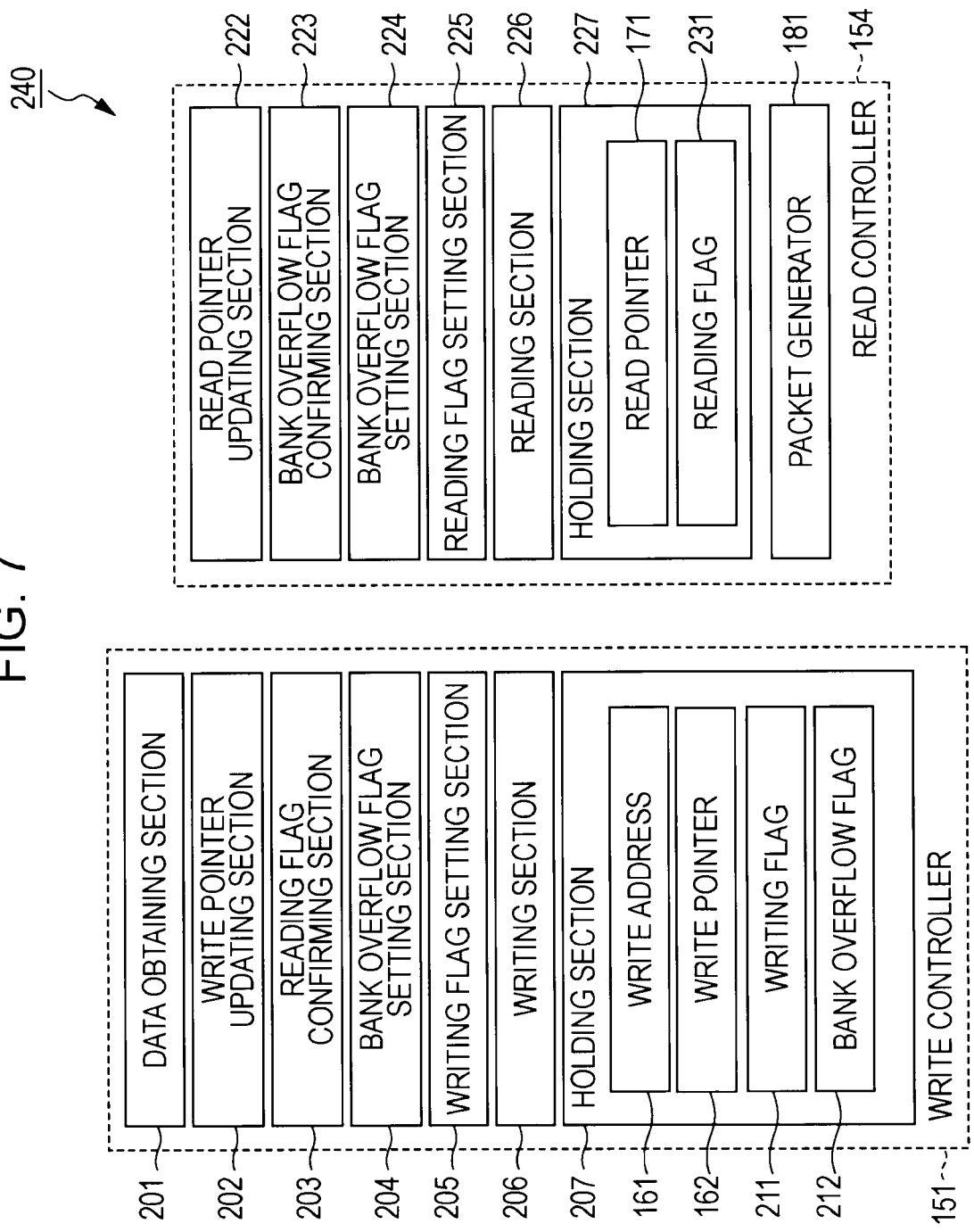
FIG. 7 is a functional block diagram illustrating an example of functions of a write controller and a read controller.

FIG. 7 is a functional block diagram illustrating an example of functions of the write controller 151 and the read controller 154.

The write controller 151 includes a data obtaining section 201, a write pointer updating section 202, a reading flag confirming section 203, a bank overflow flag setting section 204, a writing flag setting section 205, a writing section 206, and a holding section 207.

The data obtaining section 201 obtains the precinct data and the precinct attribute information which are both supplied from the line-base codec encoder 112. The write pointer updating section 202 updates the value of the write pointer 162 held in the holding section 207. The reading flag confirming section 203 holds a reading flag, i.e., flag information indicating whether the reading process is under execution, which is supplied from the read controller 154, and then notifies a situation of the reading process to the writing section 206 based on the value of the reading flag.

The bank overflow flag setting section 204 sets a bank overflow flag 212 in the holding section 207 (namely, sets the value of the flag information to be "valid (e.g., '1')"), when necessary. The bank overflow flag 212 is flag information indicating whether a state (bank-full state) not capable of storing new precinct attribute information any more without deleting the precinct attribute information, which is not yet read out, occurs in the precinct attribute information storage area 153. Details of the bank overflow flag 212 will be described later.

The writing flag setting section 205 sets a writing flag 211, i.e., flag information indicating whether the writing process is under execution, in the holding section 207, or it clears the writing flag 211 (namely, resets the value of the flag information to be "invalid (e.g., '0')"). For example, the writing flag setting section 205 sets the writing flag 211 in the holding section 207 during a period in which the writing section 206 is writing the precinct data and the precinct attribute information. Upon the end of the writing, the writing flag setting section 205 clears the writing flag 211. Thus, whether the writing process is under execution can be easily confirmed even in other control processes by referring to the value of the writing flag 211.

The writing section 206 writes the precinct data in the data storage area 152 and also writes the precinct attribute information in the precinct attribute information storage area 153. More specifically, the writing section 206 sets the write address 161 and stores the precinct data as a processing target in the data storage area 152 at the write address 161. Further, the writing section 206 adds the write address 161 to the precinct attribute information as the processing target, and then stores the precinct attribute information, including the write address 161, in the bank of the precinct attribute information storage area 153, which is designated by the write pointer 162.

The holding section 207 is a memory area formed of, for example, a semiconductor memory or a hard disk. The holding section 207 holds therein information, such as the write address 161, the write pointer 162, the writing flag 211, and the bank overflow flag 212. Of course, the holding section 207 may hold other information than the examples described above.

The read controller 154 includes a read pointer updating section 222, a bank overflow flag confirming section 223, a bank overflow flag setting section 224, a reading flag setting section 225, a reading section 226, a holding section 227, and a packet generator 181.

The read pointer updating section 222 updates the value of the read pointer 171 held in the holding section 227. The bank overflow flag confirming section 223 accesses the holding section 207 of the write controller 151 and refers to (confirm) the value of the bank overflow flag 212.

The bank overflow flag setting section 224 accesses the holding section 207 of the write controller 151 and clears the bank overflow flag 212. The reading flag setting section 225 sets the reading flag 231, i.e., flag information indicating whether the reading process is under execution, in the holding section 227, or it clears the reading flag 231. For example, the reading flag setting section 225 sets the reading flag 231 in the holding section 227 during a period in which the reading section 226 is reading information from the stored area. Upon the end of the reading, the reading flag setting section 225 clears the reading flag 231.

Thus, whether the reading process is under execution can be easily confirmed even in other control processes by referring to the value of the reading flag 231. For example, the writing section 206 can be caused not to write the data in the bank under the reading based on the result of confirming the value of the reading flag 231 by the reading flag confirming section 203. In other words, the writing section 206 can safely execute the writing in a manner not destroying the data under the reading.

The reading section 226 reads the precinct data from the data storage area 152 and also reads the precinct attribute information from the precinct attribute information storage area 153. More specifically, the reading section 226 reads the precinct attribute information from the bank of the precinct attribute information storage area 153, which is designated by the read pointer 171. Further, the reading section 226 obtains the write address 161 added to the relevant precinct attribute information, and then reads the precinct data from the data storage area 152 at the read address 172 which is provided by the obtained write address 161.

The holding section 227 is a memory area formed of, for example, a semiconductor memory or a hard disk. The holding section 227 holds therein information, such as the read pointer 171 and the reading flag 231. Of course, the holding section 227 may hold other information than the examples described above.

The packet generator 181 converts the precinct data and the precinct attribute information, which are read by the reading section 226, into the form of packets.

While the embodiment has been described above as holding the bank overflow flag 212 in the holding section 207 of the write controller 151, the bank overflow flag 212 can be held at an arbitrary location. For example, the bank overflow flag 212 may be held in the read controller 154 or at a location other than the write controller 151 and the read controller 154.

The write controller 151 and the read controller 154 may be partly or entirely constituted into an integral form. For example, the write controller 151 and the read controller 154 may be integrated into a buffer input/output controller 240 that controls input/output of the data storage area 152 and the precinct attribute information storage area 153.

Examples of cases where a bank overflow is generated and control is executed to cope with the bank overflow will be described in more detail below with reference to FIGS. 8 to 10.

In FIGS. 8 to 10, eight banks (#0 to #7) are formed in the precinct attribute information storage area (Precinct Register Bank) 153. The read pointer 171 and the write pointer 162 are each set so as to cyclically designate the eight banks one by one in a sequence from #0 toward #7 (including a return to #0 after #7).

In FIGS. 8 to 10, each of frames denoted by #0 to #7 represents a bank, and a numeral denoted in the frame represents the precinct ID of the precinct attribute information stored in the corresponding bank. The precinct ID is identification information to identify each precinct and is expressed by "0" or a positive integer. The precincts are processed in the ascending order from the precinct having the precinct ID of "0". Stated another way, the precinct data and the precinct attribute information in each precinct are written into or read from the storage area in the ascending order of the precinct ID, starting from the precinct having the precinct ID of "0".

With the structure specific to a buffer, a write position basically precedes a read position. As illustrated in FIG. 8A, for example, when the precinct attribute information in the precinct having the precinct ID of "5" is written into the sixth bank (#5), the precinct attribute information in the precinct having the precinct ID of "2" is read from the third bank (#2).

Because the write pointer 162 and the read pointer 171 are each set so as to cyclically designate the eight banks in a sequence from #0 toward #7, it can also be said from another viewpoint that the read pointer 171 designates the bank located forward in the direction of advance of the write pointer 162.

A state where the writing and the reading are normally executed is called here an "ordinary state". In the ordinary state, looking at the banks which are present between the location designated by the write pointer 162 and the location designated by the read pointer 171 in the ascending order, the precinct attribute information is not stored or the precinct attribute information having been already read is stored in those banks. Thus, in the case of FIG. 8A, the precinct attribute information not yet read is not stored in the banks #6, #7, #0 and #1 between the bank #5 and the bank #2 in the ascending order.

Assuming now that the output stop signal 144 is supplied and the reading is stopped in the above-described situation, for example, the location designated by the read pointer 171 stops further advancement, while only the location designated by the write pointer 162 advances. As illustrated in FIG. 8B, therefore, the write pointer 162 soon reaches the bank #1 and writes the precinct attribute information in the precinct having the precinct ID of "9" in the bank #1. At that time, the buffer comes into a state where the not-yet-read precinct attribute information is stored in all the banks. That state is called a bank-full state (Bank Full). In other words, the bank-full state corresponds to a state where the location designated by the write pointer 162 advances 1 cycle or more from the location designated by the read pointer 171. That state is further called a bank overflow state (Bank Over).

Even in the bank-full state, the precinct data and the precinct attribute information are supplied to the write controller 151 from the line-base codec encoder 112. Stated another ways, any data necessitates to be discarded. In such a situation, the write controller 151 discards an allowable minimum amount of information among the information, which is stored in the storage area, in sequence from the oldest information. The write controller 151 then stores newly supplied information in the area from which the information has been discarded. With such a process, the write controller 151 can more effectively suppress an influence of the occurrence of the bank-full (bank overflow) state upon quality of a decoded image (i.e., deterioration of image quality). As a result, the write controller 151 can further improve the quality of the decoded image.

Figure 9A:
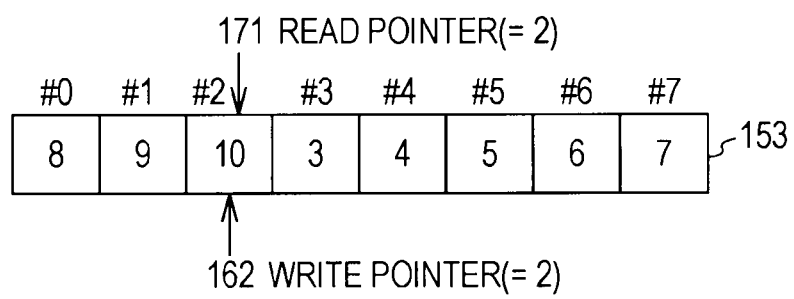
FIGS. 9A and 9B are explanatory views to explain control executed upon the occurrence of the bank overflow.

Concretely, it is assumed here that the bank #2 is not under the reading in the example illustrated in FIG. 8B. Thus, if the reading flag 231 is not set in the example illustrated in FIG. 8B, the writing section 206 stores the precinct attribute information in the next precinct (i.e., the precinct having the precinct ID of "10") in the bank #2 for overwrite, as illustrated in FIG. 9A. In other words, the writing section 206 deletes the oldest information stored in the precinct attribute information storage area 153, and stores new precinct attribute information instead.

The precinct data is stored in the data storage area 152. The capacity of the data storage area 152 can be optionally set so long as it is able to store all the precinct data corresponding to the precinct attribute information that is stored in the precinct attribute information storage area 153. Accordingly, for example, even when the bank-full state is generated in the precinct attribute information storage area 153 and the precinct attribute information is overwritten, the precinct data is not overwritten sometimes. If the capacity of the data storage area 152 is sufficiently large, the precinct data may be stored in a new area of the data storage area 152. In the following, therefore, a description regarding the precinct data is omitted unless necessary.

In the line-base codec, data is encoded for each precinct which is part of the frame image. Accordingly, if data corresponding to one precinct is lacked during the transmission, an image corresponding to one precinct is also lacked in the decoded image. The number of lines in each precinct is basically the same in common to an entire region of the frame image except for upper and lower ends thereof. This implies that, not taking into account details of the image, a degree of deterioration in image quality is theoretically equal regardless of which one of the precincts is lacked. Stated another way, because the quantity of lacked data is substantially equal regardless of data being discarded from any bank in the event of the bank-full state, the importance of the precinct attribute information in each bank is also substantially equal in terms of that point.

As described above, however, the precinct data and the precinct attribute information are image information having been subjected to the line-base codec, and are processed in the receiving apparatus 103 in the sequence of precincts. When the data transmission becomes too late with respect to the data processing, the processing of data in the relevant precinct is omitted and the processing of data in the next precinct is started. In other words, the data not in time for the start of the processing is discarded. Thus, the processing is partly omitted in the receiving apparatus 103, but the processing sequence is not changed in such a manner, for example, that data in the precinct, which has been transmitted with a delay beyond the time of a decoding process, is processed later.

This implies that data in the precinct, which is temporally older, is given with a shorter time until the time limit in the start of the decoding process, and hence has a higher possibility of being discarded after the transmission thereof. Stated another way, data in the temporally older precinct has a lower level of importance.

In particular, the above-described line-base codec is featured in shortening the delay time attributable to the data transmission. Accordingly, the buffer capacity of each of the sending buffer 113 and the receiving buffer 122 is desirably set as small as possible, and a temporal allowance until data becomes unnecessary is generally smaller in the line-base codec than the other codec techniques. Hence, regarding information stored in the precinct attribute information storage area 153, a change in level of importance depending on freshness of the information is greater in the line-base codec.

By overwriting the information stored in the buffer from the oldest information upon the occurrence of the bank-full state as described above with reference to FIG. 9A, therefore, the writing section 206 can discard (overwrite) the buffered information from the information having the lowest level of importance. As a result, deterioration in quality of the decoded image can be suppressed to a less extent.

Because of older information having a higher possibility of being discarded due to a transmission delay as described above, if the buffered information is overwritten with new information, there is a risk of discarding both the old information and the new information, i.e., a risk of increasing the quantity of information discarded. By overwriting the buffered information from the oldest information as described above, therefore, the writing section 206 can avoid the information from being unnecessarily discarded and can reduce the quantity of information discarded. Thus, deterioration in quality of the decoded image can be further suppressed.

Figure 9B:
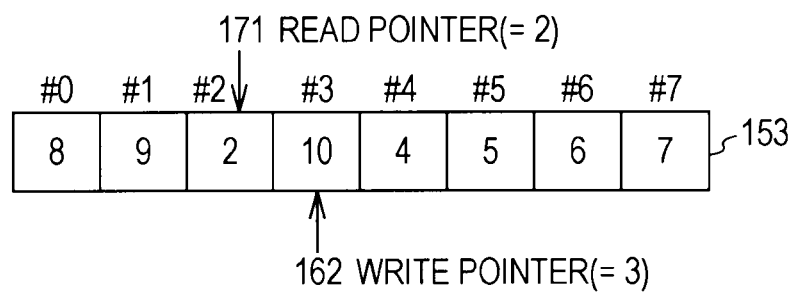

For example, when the bank #2 is under the reading, the writing section 206 causes the precinct attribute information in the next precinct to be stored in the bank #3, which is positioned next to the bank #2 designated by the read pointer 171, as illustrated in FIG. 9B. Stated another way, in such a case, the writing section 206 overwrites the precinct attribute information in the bank #3 with the precinct attribute information in the precinct having the precinct ID of "10". The reason why the new precinct attribute information is not written into the bank #2 is to prevent the data under the reading from being destroyed. The destroyed data is discarded because that data is not decoded even if transmitted. This implies that the reading process of the relevant data is executed in vain. Accordingly, overwrite of the information in the bank under the reading is inhibited and the information in the next bank is overwritten with new information. As a result, the writing section 206 can suppress a reduction of processing efficiency.

Figure 10A:
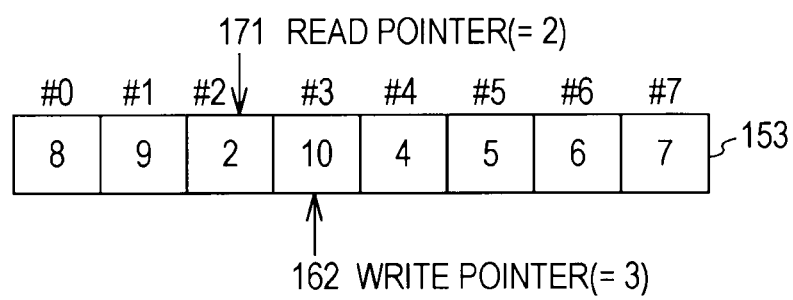
FIGS. 10A and 10B are explanatory views to explain control executed upon the occurrence of the bank overflow.
Figure 10B:
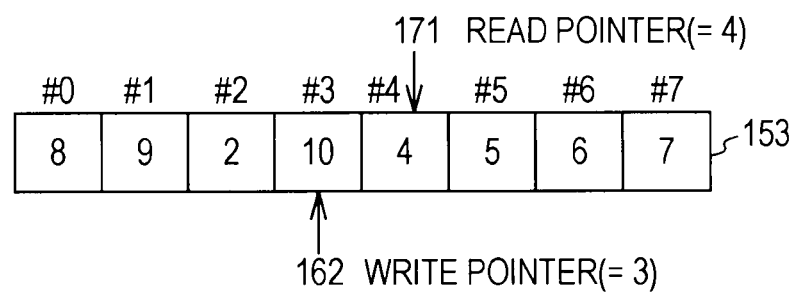

When the supply of the output stop signal 144 is ceased, the reading is resumed. For example, if the reading is resumed in a state of FIG. 10A where the bank-full state occurs as in the state of FIG. 9A, the read pointer 171 is advanced to a bank, which is positioned next to the bank designated by the write pointer 162, as illustrated in FIG. 10B. Stated another way, FIG. 10A illustrates the bank-full state where the read pointer 171 designates the bank #2 and the write pointer 162 designates the bank #3. When the reading is resumed in that bank-full state, the read point updating section 222 updates the value of the read pointer 171 to, instead of the next bank #3, the bank #4 which is positioned next to the bank designated by the write pointer 162.

With the above-described update, the reading section 216 can be controlled so as not to read the precinct attribute information in the precinct having the precinct ID of "10", i.e., the latest precinct, while skipping the precincts having the precinct IDs of "4" to "9". Thus, the reading section 216 can execute the reading in the sequence of precinct ID such that, subsequent to the precinct attribute information in the precinct having the precinct ID of "2", the precinct attribute information in the next oldest precinct, i.e., in the precinct having the precinct ID of "4", is read. In the illustrated case, therefore, the data discarded due to the occurrence of the bank-full state is only the precinct attribute information in the precinct having the precinct ID of "3". Accordingly, the discarded data can be reduced to a possibly minimum quantity, and undesired deterioration in quality of the decoded image can be suppressed (namely, image quality can be improved).

When information is written after the value of the write pointer 162 has been updated, there is a possibility that the precinct attribute information stored in the bank designated by the write pointer 162 may be oldest. Such a possibility can be avoided, for example, by determining, based on the value of the writing flag 211, whether the writing has been started, and by defining the destination of movement of the read pointer 171 based on the determination result. However, such a method not only makes timing control, etc., complicated, but also necessitates the complicated control to be executed in an accurate manner. Thus, correct control free from errors can be more easily performed by unconditionally setting the location designated by the read pointer 171 to the bank, which is positioned next to the bank designated by the write pointer 162.

Another conceivable example of a buffer control method for coping with the occurrence of the bank-full state is to empty all the banks and then store data of new precincts in the empty banks. This method can be performed with simple control, but it accompanies a risk of discarding data in more quantity than an allowable necessary level when the reading is resumed after the lapse of a very short period. In other words, that type of buffer control method has a risk of deteriorating the quality of the decoded image. Particularly, when the transmission path 102 is in the form of wireless communication, a transmission rate varies to such a large extent that a situation not capable of sending data temporarily occurs very often. In such a situation, particularly, the possibility of undesirably deteriorating the quality of the decoded image is increased with the above-mentioned buffer control method.

Still another example of the conceivable control methods is to prepare a larger number of banks in advance in order to cope with temporary jamming of a network. The occurrence of the bank-full state can be suppressed by increasing the number of banks. However, that control method accompanies a risk of increasing the memory capacity that is necessary as the buffer. An increase in the memory capacity results in not only higher costs, but also a longer delay time in the data transmission. Thus, the method of increasing the number of banks is effective, for example, in the data transmission that utilizes the codec in which a delay is not so significant, as in the related-art codec.

In the data transmission utilizing the above-described line-base codec, however, a low delay is an important feature. The line-base codec includes various contrivances to realize the low delay. For example, an increase of the delay time in the transmission is suppressed by setting a processing unit to a smaller quantity of data and reducing the memory capacity necessary for the buffer. If the number of banks is increased, as mentioned above, in such a system to increase the memory capacity, a risk may occur in that the delay time is increased and the above-mentioned advantage is impaired.

Further, because a degree of jamming in the network differs depending on characteristics of the network used, it is difficult to define the number of banks, which is sufficient to prevent the occurrence of the bank-full state. Even when an upper limit of the number of banks is defined as one of system specifications, there is a fair possibility that the transmission path 102 may come into a worse condition than expected. Defining the number of banks based on the worst values at all times leads to a risk of undesirably increasing the costs, the circuit scale, the power consumption, etc. Although the number of banks can be dynamically changed, such a method necessitates very complicated control and is not practical.

In contrast, the above-described input/output control method according to the embodiment can suppress undesired deterioration in quality of the decoded image with easier control.

Figure 11:
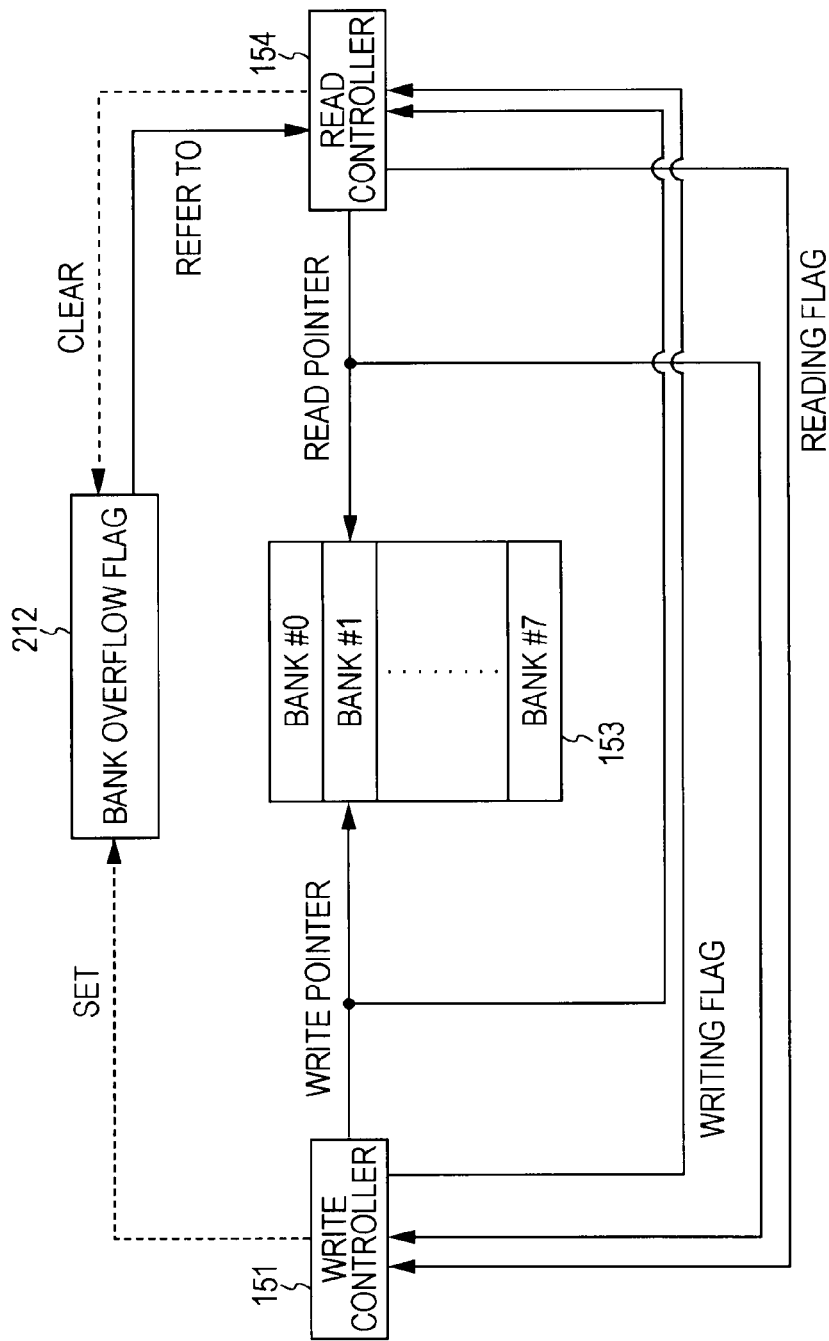
FIG. 11 is a block diagram to explain control situations of various pointers and flags.

Control situations of various pointers and flags will be described below with reference to FIG. 11. As illustrated in FIG. 11, the write controller 151 updates the write pointer 162 and notifies the updated result to the read controller 154. Also, the write controller 151 sets or clears the writing flag 211. When the write controller 151 sets or clears the writing flag 211, the write controller 151 may notify the value of the writing flag 211 to the read controller 154. Further, the write controller 151 sets the bank overflow flag 212 when the bank-full state occurs in the precinct attribute information storage area 153.

The read controller 154 updates the read pointer 171 and notifies the updated result to the write controller 151. Also, the read controller 154 sets or clears the reading flag 231. When the read controller 154 sets or clears the reading flag 231, the read controller 154 may notify the value of the reading flag 231 to the write controller 151. Further, the read controller 154 refers to the value of the bank overflow flag 212 and confirms whether the bank-full state is generated in the precinct attribute information storage area 153. In addition, the read controller 154 clears the bank overflow flag 212 when the bank-full state is eliminated in the precinct attribute information storage area 153.

As described above, the write controller 151 and the read controller 154 operate independently of each other. Respective processing flows executed by the write controller 151 and the read controller 154 will be described below.

Update timings of the write pointer 162 and the read pointer 171 are grouped into two patterns depending on before and after each of the (writing and reading) processes (i.e., at the start and the end thereof). Specifically, there are four patterns, i.e., Cases 1 to 4, as illustrated in FIG. 12.

In the following, examples of the processing flows are described for each of the four patterns.

First, a description is made for the case where the update timings of the write pointer 162 and the read pointer 171 are respectively before the writing and the reading (i.e., at the start thereof), namely Case 1.

Figure 13:
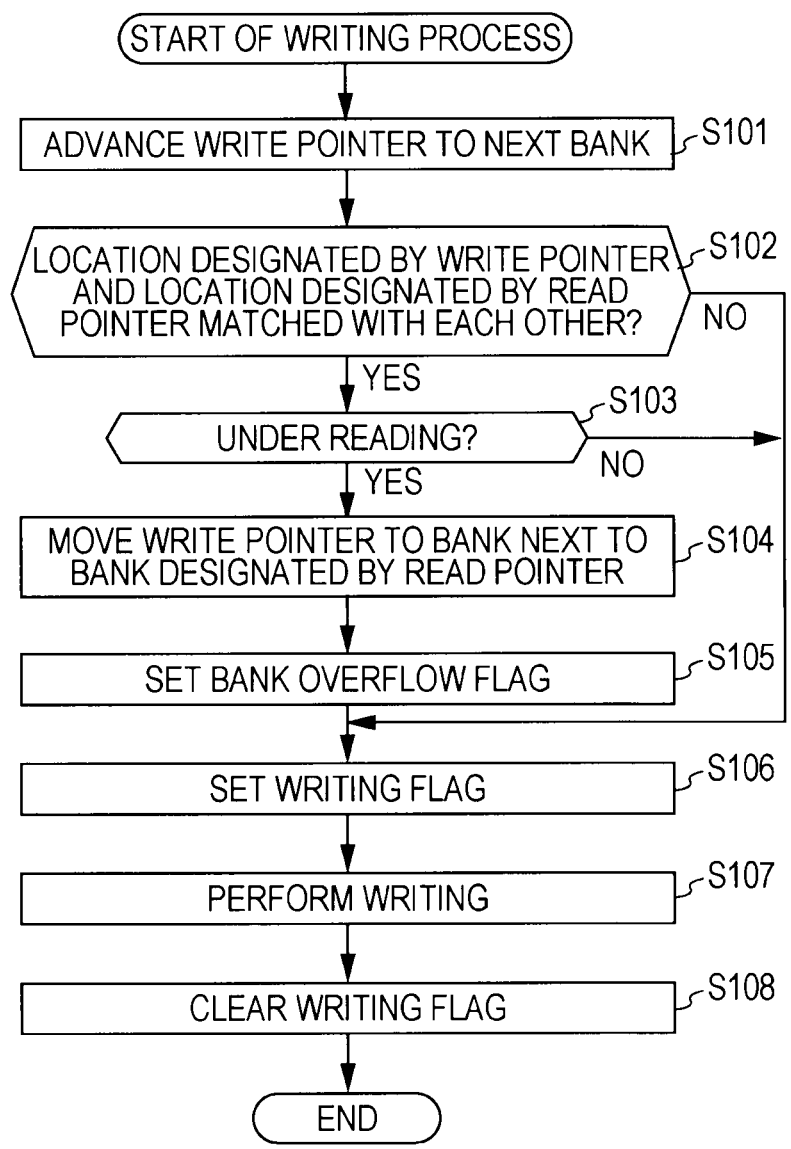
FIG. 13 is a flowchart to explain an example of a write processing flow in Case 1.

An example of the flow of the writing process executed by the write controller 151 in Case 1 is described with reference to a flowchart of FIG. 13. The writing process is executed whenever the precinct data and the precinct attribute information in a new precinct are supplied from the line-base codec encoder 112. This point is similarly applied to the writing process in the other Cases.

When the data obtaining section 201 (FIG. 7) of the write controller 151 obtains the precinct data and the precinct attribute information in the new precinct, the writing process is started. Upon the start of the writing process, the write pointer updating section 202 updates the write pointer 162 and advances the location designated by the write pointer 162 to the next bank in step S101. In step S102, the write pointer updating section 202 determines whether the location (bank) designated by the updated write pointer 162 and the location (bank) designated by the read pointer 171, the latter being notified to the write pointer updating section 202, are matched with each other. If it is determined that both the locations are matched with each other, the processing advances to step S103.

In step S103, the reading flag confirming section 203 refers to the reading flag 231 and determines whether the data stored in the bank designated by the write pointer 162 is under the reading by the read controller 154. If the reading flag 231 is set and the reading of the relevant data is determined as being under the execution, the processing advances to step S104.

In step S104, the write pointer updating section 202 moves the location designated by the write pointer 162 to the bank, which is positioned next to the bank designated by the read pointer 171, so that the data under the reading is not destroyed. At this point in time, because the bank-full state is generated, the bank overflow flag setting section 204 sets the bank overflow flag 212 in step S105.

Upon the setting of the bank overflow flag 212, the writing flag setting section 205 sets the writing flag 211 in step S106. In step S107, the writing section 206 stores the precinct data obtained by the data obtaining section 201 in the data storage area 152. Further, the writing section 206 adds the write address 161 to the precinct attribute information obtained by the data obtaining section 201 and then writes the precinct attribute information in the bank designated by the write pointer 162. After the end of the writing, the writing flag setting section 205 clears the writing flag 211 in step S108, whereby the writing process is brought to an end.

If the reading flag 231 is not set and the reading of the relevant data is determined as being not under execution in step S103, the processing advances to step S106 in which the writing flag 211 is set. Thus, in this case, the location designated by the write pointer 162 is not moved and the writing of the precinct attribute information into the currently designated bank is executed. Of course, the writing of the precinct data into the data storage area 152 is also executed.

In Case 1, the read pointer 171 is updated before the reading. Accordingly, when the reading flag 213 is not set, this implies that the data stored in the relevant bank has already been read. Even with new precinct attribute information written into the relevant bank, therefore, normal reading can be executed because the next reading is performed from the next bank. Hence, at that point in time, the bank-full state is not generated and the bank overflow flag 212 is not set.

The processing subsequent to step S107 is the same as that described above, and hence a description thereof is omitted here.

If it is determined in step S102 that the location (bank) designated by the write pointer 162 and the location (bank) designated by the read pointer 171 are not matched with each other, this can be considered as representing any of two situations. In one of the two situations, the bank-full state is not generated. In the other situation, the bank-full state is already generated and a state of the write pointer 162 outrunning the read pointer 171 is continued. In any situation, because the setting of the bank overflow flag 212 is not changed and information can be written into the bank currently designated by the write pointer 162, the processing advances to step S106. The processing subsequent to step S106 is the same as that described above, and hence a description thereof is omitted here.

The writing process in Case 1 is executed as described above.

Figure 14:
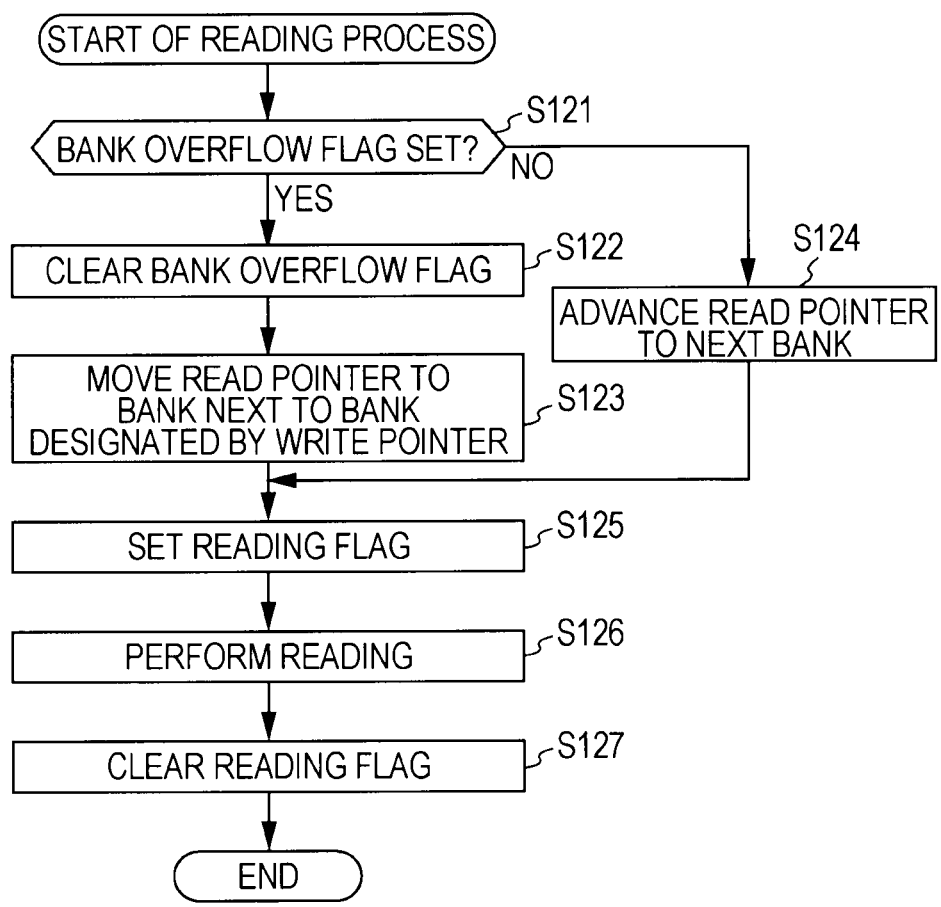
FIG. 14 is a flowchart to explain an example of a read processing flow in Case 1.

Next, a reading process in Case 1 is described with reference to a flowchart of FIG. 14. The reading process is repeatedly executed unless the output stop signal 144 is supplied, or so long as the not-yet-read precinct data is present in the storage area. This point is similarly applied to the reading process in the other Cases.

Upon the start of the reading process, the bank overflow flag confirming section 223 determines in step S121 whether the bank overflow flag 212 is set. If it is determined that the bank overflow flag 212 is set, the processing advances to step S122.

In step S122, the bank overflow flag setting section 224 clears the bank overflow flag 212 because the bank-full state is eliminated by the processing that is goring to be executed next. In step S123, the read pointer updating section 222 moves the location designated by the read pointer 171 to the bank, which is positioned next to the bank designated by the write pointer 162. This processing is to, as described above, reduce the number of discarded precincts with a simple manner.

After the read pointer 171 has been updated, the reading flag setting section 225 sets the reading flag 231 in step S125, thus indicating that the reading process is under the execution. In step S126, the reading section 226 reads the precinct attribute information from the bank designated by the read pointer 171. Also, the reading section 226 reads the precinct data by using the write address 161, which is added to the precinct attribute information having been read. After the reading of the data, the reading flag setting section 225 clears the reading flag 231 in step S127, whereby the reading process is brought to an end.

If it is determined in step S121 that the bank overflow flag 212 is not set, the processing advances to step S124. In this case, because the bank-full state is not generated, the read pointer updating section 222 advances, in step S124, the location designated by the read pointer 171 to the bank which is scheduled to be designated next (i.e., the bank positioned next to that currently designated). After the read pointer 171 has been updated, the processing advances to step S125. The processing subsequent to step S125 is the same as that described above, and hence a description thereof is omitted here.

The reading process in Case 1 is executed as described above. By controlling the writing and the reading of data as described above, the input/output control of the buffer can be more appropriately performed in Case 1. As a result, the influence upon the decoded image can be further reduced even when the bank-full state is generated.

Next, a description is made for the case where the update timing of the write pointer 162 is before the writing (i.e., at the start thereof) and the update timing of the read pointer 171 is after the reading (i.e., at the end thereof), namely Case 2.

Figure 15:
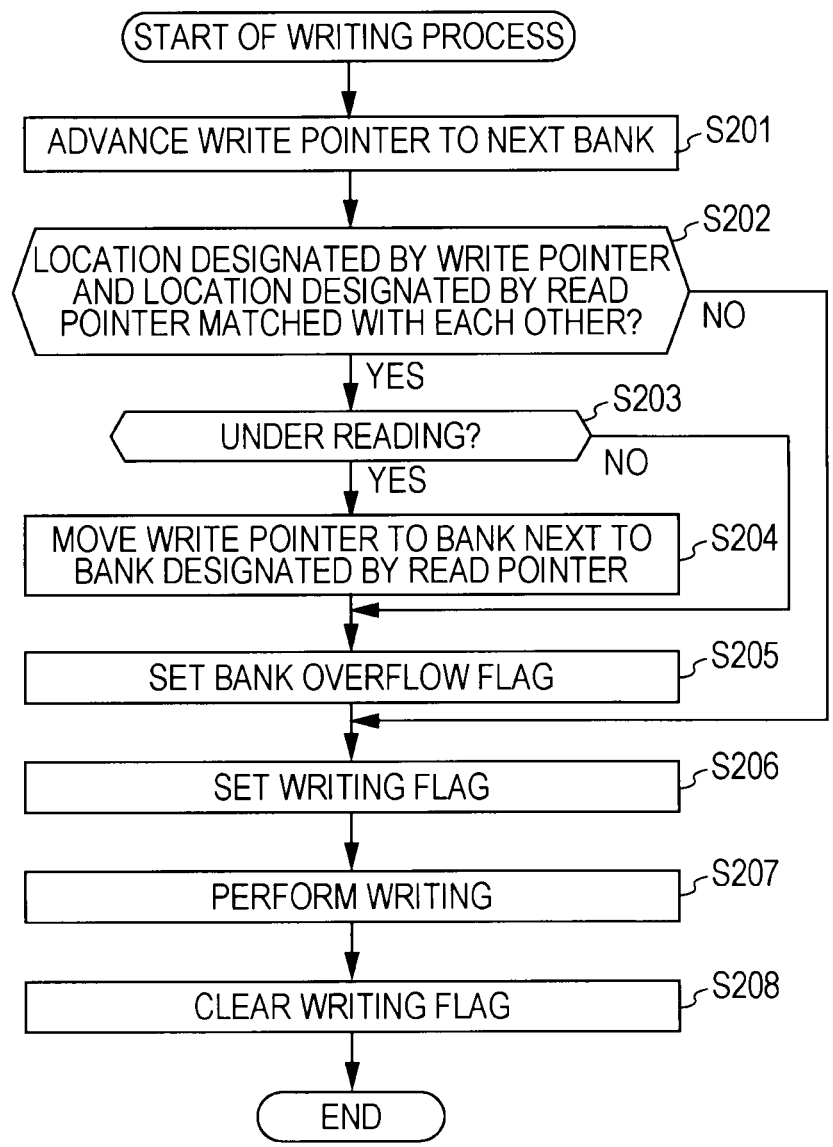
FIG. 15 is a flowchart to explain an example of a write processing flow in Case 2.

An example of the flow of the writing process executed by the write controller 151 in Case 2 is described with reference to a flowchart of FIG. 15.

When the data obtaining section 201 (FIG. 7) obtains the data in a new precinct, the writing process is started. Upon the start of the writing process, the write pointer updating section 202 updates the write pointer 162 and advances the location designated by the write pointer 162 to the bank, which is positioned next to the currently designated bank, in step S201. In step S202, the write pointer updating section 202 determines whether the location (bank) designated by the updated write pointer 162 and the location (bank) designated by the read pointer 171, the latter being notified to the write pointer updating section 202, are matched with each other. If it is determined that both the locations are matched with each other, the processing advances to step S203.

In step S203, the reading flag confirming section 203 refers to the reading flag 231 and determines whether the data stored in the bank designated by the write pointer 162 is under the reading by the read controller 154. If the reading flag 231 is set and the reading of the relevant data is determined as being under the execution, the processing advances to step S204.

In step S204, the write pointer updating section 202 moves the location designated by the write pointer 162 to the bank, which is positioned next to the bank designated by the read pointer 171, so that the data under the reading is not destroyed. At this point in time, because the bank-full state is generated, the bank overflow flag setting section 204 sets the bank overflow flag 212 in step S205.

Upon the setting of the bank overflow flag 212, the writing flag setting section 205 sets the writing flag 211 in step S206. In step S207, the writing section 206 stores the precinct data obtained by the data obtaining section 201 in the data storage area 152. Further, the writing section 206 adds the write address 161 to the precinct attribute information obtained by the data obtaining section 201 and then writes the precinct attribute information in the bank (at the location) designated by the write pointer 162. After the end of the writing, the writing flag setting section 205 clears the writing flag 211 in step S208, whereby the writing process is brought to an end.

Thus, when the bank-full state is generated and the reading of the relevant data is under the execution, the processing is executed in the same manner as that in Case 1.

If the reading flag 231 is not set and the reading of the relevant data is determined as being not under the execution in step S203, the processing advances to step S205 in which the bank overflow flag 212 is set. In case S2, the reading flag 231 is updated after the reading. Accordingly, if the reading flag 231 is not set, this implies that the data in the relevant bank is not yet read. Stated another way, if the relevant data is not under the reading, the writing into the relevant bank is enabled, but the bank-full state is generated with the writing. In that case, therefore, the processing advances to step S205 in which the bank overflow flag 212 is set. The processing subsequent to step S206 is the same as that described above, and hence a description thereof is omitted here.

If it is determined in step S202 that the location (bank) designated by the write pointer 162 and the location (bank) designated by the read pointer 171 are not matched with each other, this can be considered as representing any of two situations. In one of the two situations, the bank-full state is not generated. In the other situation, the bank-full state is already generated and a state of the write pointer 162 outrunning the read pointer 171 is continued. In any situation, because the setting of the bank overflow flag 212 is not changed and information can be written into the bank currently designated by the write pointer 162, the processing advances to step S206. The processing subsequent to step S206 is the same as that described above, and hence a description thereof is omitted here.

The writing process in Case 2 is executed as described above.

Figure 16:
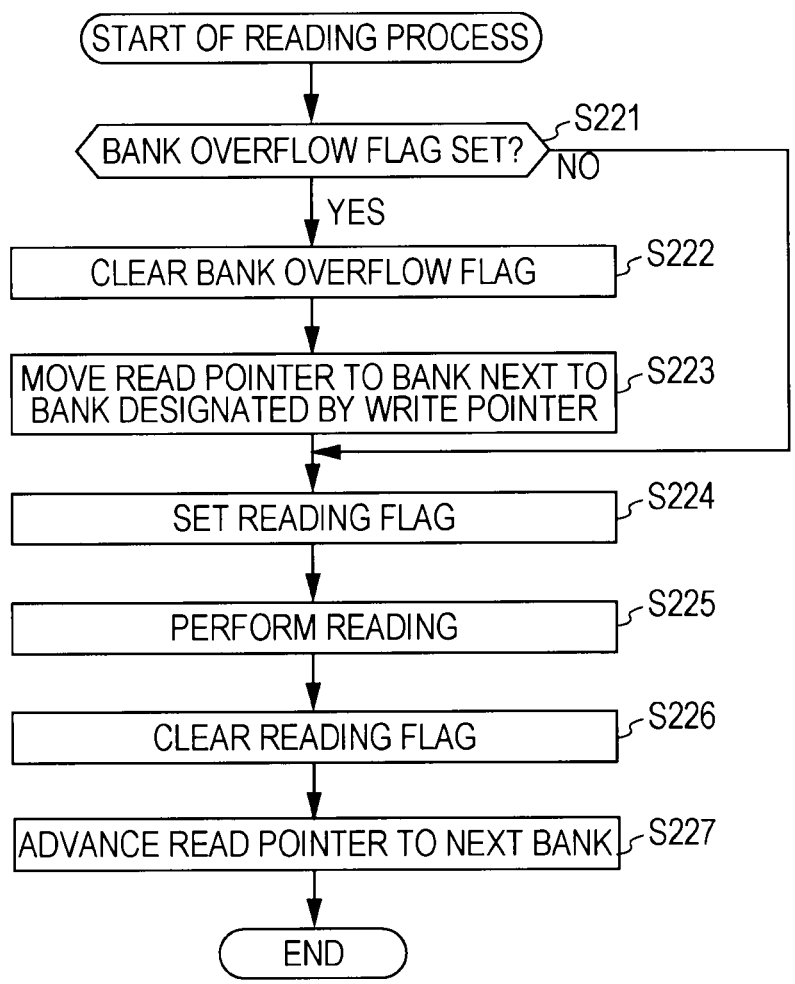
FIG. 16 is a flowchart to explain an example of a read processing flow in Case 2.

Next, a reading process in Case 2 is described with reference to a flowchart of FIG. 16.

Upon the start of the reading process, the bank overflow flag confirming section 223 determines in step S221 whether the bank overflow flag 212 is set. If it is determined that the bank overflow flag 212 is set, the processing advances to step S222.

In step S222, the bank overflow flag setting section 224 clears the bank overflow flag 212 because the bank-full state is eliminated by the processing that is going to be executed next. In step S223, the read pointer updating section 222 moves the location designated by the read pointer 171 to the bank, which is positioned next to the bank designated by the write pointer 162. This processing is to, as described above, reduce the number of discarded precincts with a simple manner.

After the read pointer 171 has been updated, the reading flag setting section 225 sets the reading flag 231 in step S224, thus indicating that the reading process is under the execution. In step S225, the reading section 226 reads the precinct attribute information from the bank designated by the read pointer 171. Also, the reading section 226 reads the precinct data by using the write address 161, which is added to the precinct attribute information having been read. After the reading of the data, the reading flag setting section 225 clears the reading flag 231 in step S226. Further, the location designated by the read pointer 171 is advanced to the next bank in step S227, whereby the reading process is brought to an end.

Thus, when the buffer is in the bank-full state, the bank-full state is eliminated regardless of the pointer positions by executing the above-described reading process (i.e., the processing in step S223).

Further, in Case 2, although the update timing of the read pointer 171 is basically at the end of the reading, the read pointer 171 is especially updated not only after the reading, but also before the reading (step S223) in order to reduce the quantity of discarded data when the bank-full state is generated.

If it is determined in step S221 that the bank overflow flag 212 is not set, the processing advances to step S224. In this case, because the bank-full state is not generated, the update of the read pointer 171 before the reading is not executed. The processing subsequent to step S224 is the same as that described above, and hence a description thereof is omitted here.

The reading process in Case 2 is executed as described above. By controlling the writing and the reading of data as described above, the input/output control of the buffer can also be more appropriately performed in Case 2. As a result, the influence upon the decoded image can be further reduced even when the bank-full state is generated.

Next, a description is made for the case where the update timing of the write pointer 162 is after the writing (i.e., at the end thereof) and the update timing of the read pointer 171 is before the reading (i.e., at the start thereof), namely Case 3.

Figure 17:
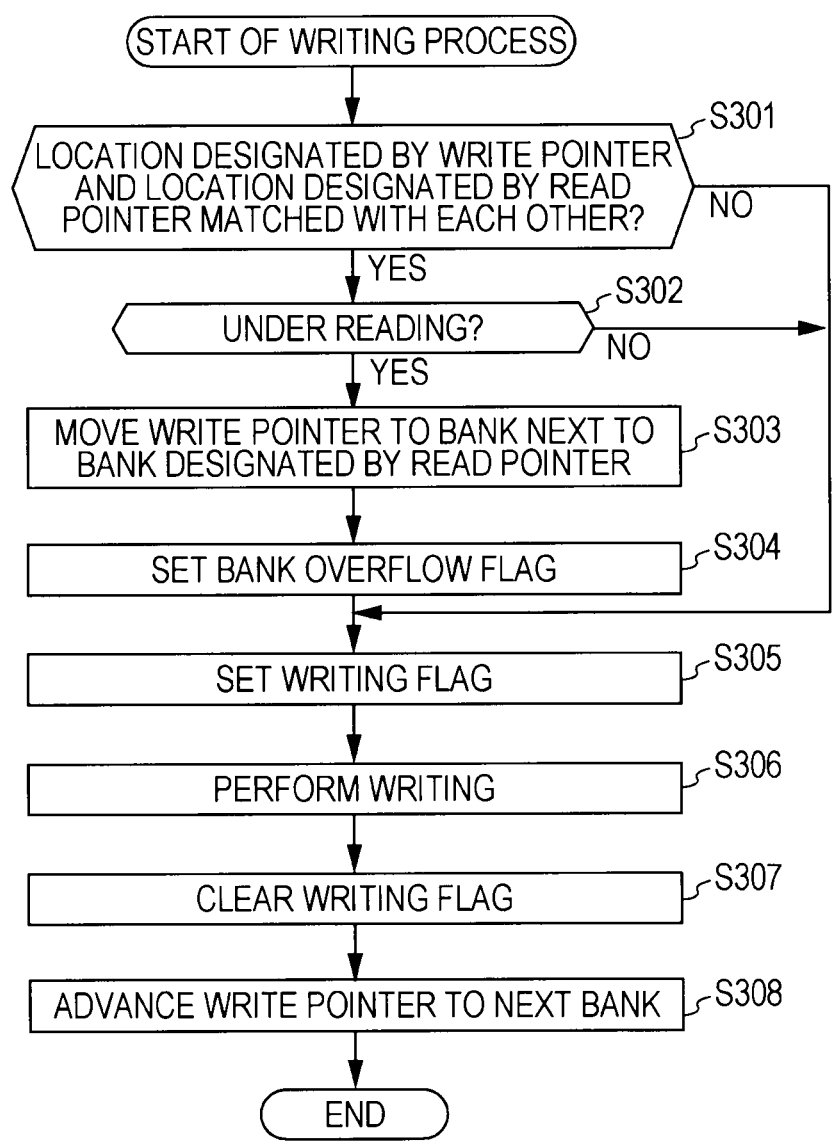
FIG. 17 is a flowchart to explain an example of a write processing flow in Case 3.

An example of the flow of the writing process executed by the write controller 151 in Case 3 is described with reference to a flowchart of FIG. 17.

When the data obtaining section 201 obtains the precinct data and the precinct attribute information in a new precinct, the writing process is started. Upon the start of the writing process, the write pointer updating section 202 determines in step S301 whether the location (bank) designated by the write pointer 162 and the location (bank) designated by the read pointer 171, the latter being notified to the write pointer updating section 202, are matched with each other. If it is determined that both the locations are matched with each other, the processing advances to step S302.

In step S302, the reading flag confirming section 203 refers to the reading flag 231 and determines whether the data stored in the bank designated by the write pointer 162 is under the reading by the read controller 154. If the reading flag 231 is set and the reading of the relevant data is determined as being under the execution, the processing advances to step S303.

In step S303, the write pointer updating section 202 moves the location designated by the write pointer 162 to the bank, which is positioned next to the bank designated by the read pointer 171, so that the data under the reading is not destroyed. At this point in time, because the bank-full state is generated, the bank overflow flag setting section 204 sets the bank overflow flag 212 in step S304.

Upon the setting of the bank overflow flag 212, the writing flag setting section 205 sets the writing flag 211 in step S305. In step S306, the writing section 206 stores the precinct data obtained by the data obtaining section 201 in the data storage area 152. Further, the writing section 206 adds the write address 161 to the precinct attribute information obtained by the data obtaining section 201 and then writes the precinct attribute information in the bank designated by the write pointer 162. After the end of the writing, the writing flag setting section 205 clears the writing flag 211 in step S307. Further, the write pointer updating section 202 updates the write pointer 162 and advances the location designated by the write pointer 162 to the next bank in step S308, whereby the writing process is brought to an end.

Thus, in Case 3, when the write pointer 162 catches up the read pointer 171 and the read controller 154 is during the reading of the data in the relevant bank, the processing is executed basically in the same manner as that in above-described Cases 1 and 2. However, the update timing of the write pointer 162 differs between Case 3 and Cases 1 and 2.

If the reading flag 231 is not set and the reading of the relevant data is determined as being not under the execution in step S302, the processing advances to step S305 in which the writing flag 211 is set. Stated another way, in this case, the location designated by the write pointer 162 is not moved and the writing of the precinct attribute information into the currently designated bank is executed. Of course, the writing of the precinct data into the data storage area 152 is also executed.

In Case 3, the read pointer 171 is updated before the reading. Accordingly, when the reading flag 231 is not set, this implies that the data stored in the relevant bank has already been read. Even with new precinct attribute information written into the relevant bank, therefore, normal reading can be executed because the next reading is performed from the next bank. Hence, at that point in time, the bank-full state is not generated and the bank overflow flag 212 is not set.

The processing subsequent to step S306 is the same as that described above, and hence a description thereof is omitted here.

If it is determined in step S301 that the location (bank) designated by the write pointer 162 and the location (bank) designated by the read pointer 171 are not matched with each other, this can be considered as representing any of two situations. In one of the two situations, the bank-full state is not generated. In the other situation, the bank-full state is already generated and a state of the write pointer 162 outrunning the read pointer 171 is continued. In any situation, because the setting of the bank overflow flag 212 is not changed and information can be written into the bank currently designated by the write pointer 162, the processing advances to step S305. The processing subsequent to step S305 is the same as that described above, and hence a description thereof is omitted here.

The writing process in Case 3 is executed as described above.

Figure 18:
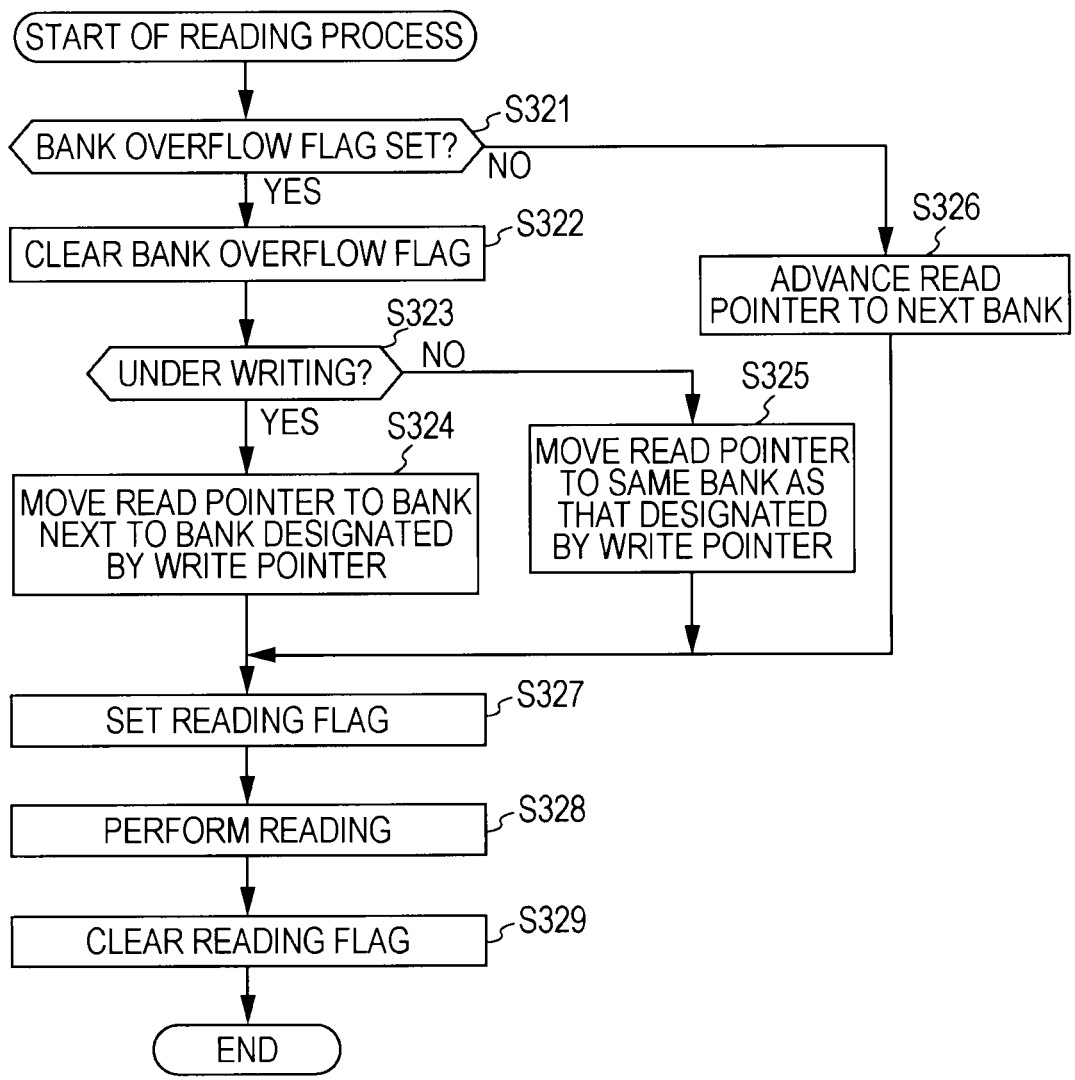
FIG. 18 is a flowchart to explain an example of a read processing flow in Case 3.

Next, a reading process in Case 3 is described with reference to a flowchart of FIG. 18.

Upon the start of the reading process, the bank overflow flag confirming section 223 determines in step S321 whether the bank overflow flag 212 is set. If it is determined that the bank overflow flag 212 is set, the processing advances to step S322.

In step S322, the bank overflow flag setting section 224 clears the bank overflow flag 212 because the bank-full state is eliminated by the processing that is goring to be executed next. In step S323, the read pointer updating section 222 confirms whether the writing flag 211 is set, thus determining whether the data is under the writing by the write controller 151. If it is determined that the data is under the writing, the processing advances to step S324.

In step S324, the read pointer updating section 222 moves the location designated by the read pointer 171 to the bank, which is positioned next to the bank designated by the write pointer 162. That processing is to, as described above, reduce the number of discarded precincts with a simple manner. That processing is also effective in preventing the data in the bank under the writing from being read.

After the read pointer 171 has been updated, the reading flag setting section 225 sets the reading flag 231 in step S327, thus indicating that the reading process is under the execution. In step S328, the reading section 226 reads the precinct attribute information from the bank designated by the read pointer 171. Also, the reading section 226 reads the precinct data by using the write address 161, which is added to the precinct attribute information having been read. After the reading of the data, the reading flag setting section 225 clears the reading flag 231 in step S329, whereby the reading process is brought to an end.

If it is determined in step S323 that the data is not under the writing by the write controller 151, the processing advances to step S325. In step S325, the read pointer updating section 222 moves the location designated by the read pointer 171 to the bank designated by the write pointer 162.

In Case 3, the write pointer 162 is updated after the writing. Accordingly, if the writing flag 21 is not set, this implies that the data in the relevant bank is not yet updated to new data. In this case, therefore, the data in the bank designated by the write pointer 162 is the oldest among the data stored in all the banks. Hence, the read controller 154 can further reduce the number of discarded precincts by reading the data in the bank designated by the write pointer 162 (step S325) if the processing is not under the writing.

Stated another way, the write controller 151 confirms in step S323 whether the processing is under the writing, and controls the destination of movement of the location designated by the read pointer 171 depending on the confirmation result. As a result, the write controller 151 can further reduce the number of discarded precincts.

After the end of the processing in step S325, the processing advances to step S327. The processing subsequent to step S327 is the same as that described above, and hence a description thereof is omitted here.

If it is determined in step S321 that the bank overflow flag 212 is not set, the processing advances to step S326. In this case, because the bank-full state is not generated, the read pointer updating section 222 advances the location designated by the read pointer 171 to the bank scheduled to be designated next (i.e., the bank which is positioned next to the currently designated bank) in step S326. After the read pointer 171 has been updated, the processing advances to step S327. The processing subsequent to step S327 is the same as that described above, and hence a description thereof is omitted here.

The reading process in Case 3 is executed as described above. By controlling the writing and the reading of data as described above, the input/output control of the buffer can also be more appropriately performed in Case 3. As a result, the influence upon the decoded image can be further reduced even when the bank-full state is generated.

Next, a description is made for the case where the update timings of the write pointer 162 and the read pointer 171 are respectively after the writing and the reading (i.e., at the end thereof), namely Case 4.

Figure 19:
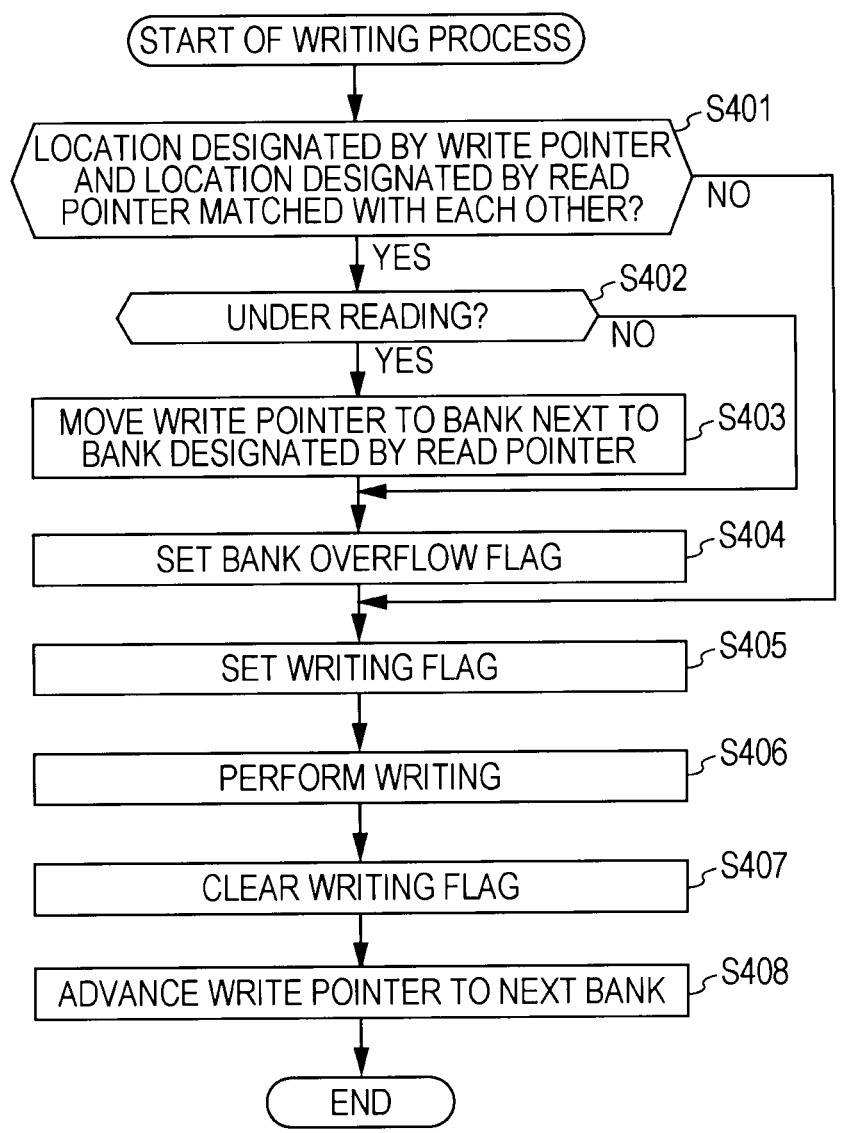
FIG. 19 is a flowchart to explain an example of a write processing flow in Case 4.

An example of the flow of the writing process executed by the write controller 151 in Case 4 is described with reference to a flowchart of FIG. 19.

When the data obtaining section 201 (FIG. 7) obtains the data in a new precinct, the writing process is started. Upon the start of the writing process, the write pointer updating section 202 determines in step S401 whether the location (bank) designated by the write pointer 162 and the location (bank) designated by the read pointer 171, the latter being notified to the write pointer updating section 202, are matched with each other. If it is determined that both the locations are matched with each other, the processing advances to step S402.

In step S402, the reading flag confirming section 203 refers to the reading flag 231 and determines whether the data stored in the bank designated by the write pointer 162 is under the reading by the read controller 154. If the reading flag 231 is set and the reading of the relevant data is determined as being under the execution, the processing advances to step S403.

In step S403, the write pointer updating section 202 moves the location designated by the write pointer 162 to the bank, which is positioned next to the bank designated by the read pointer 171, so that the data under the reading is not destroyed. At this point in time, because the bank-full state is generated, the bank overflow flag setting section 204 sets the bank overflow flag 212 in step S404.

Upon the setting of the bank overflow flag 212, the writing flag setting section 205 sets the writing flag 211 in step S405. In step S406, the writing section 206 stores the precinct data obtained by the data obtaining section 201 in the data storage area 152. Further, the writing section 206 adds the write address 161 to the precinct attribute information obtained by the data obtaining section 201 and then writes the precinct attribute information in the bank designated by the write pointer 162. After the end of the writing, the writing flag setting section 205 clears the writing flag 211 in step S407. Further, the write pointer updating section 202 advances in step S408 the location designated by the write pointer 162 to the bank which is positioned next to the currently designated bank, whereby the writing process is brought to an end.

Thus, when the bank-full state is generated and the reading of the data is under execution, the processing is executed in the same manner as that in above-described Case 3.

If the reading flag 231 is not set and the reading of the data is determined as being not under the execution in step S402, the processing advances to step S404 in which the bank overflow flag 212 is set. In case S4, the reading flag 231 is updated after the reading. Accordingly, if the reading flag 231 is not set, this implies that the data in the relevant bank is not yet read. Stated another way, if the data is not under the reading, the writing into the relevant bank is enabled, but the bank-full state is generated with the writing. In that case, therefore, the processing advances to step S404 in which the bank overflow flag 212 is set. The processing subsequent to step S405 is the same as that described above, and hence a description thereof is omitted here.

If it is determined in step S401 that the location (bank) designated by the write pointer 162 and the location (bank) designated by the read pointer 171 are not matched with each other, this can be considered as representing any of two situations. In one of the two situations, the bank-full state is not generated. In the other situation, the bank-full state is already generated and a state of the write pointer 162 outrunning the read pointer 171 is continued. In any situation, because the setting of the bank overflow flag 212 is not changed and information can be written into the bank currently designated by the write pointer 162, the processing advances to step S405. The processing subsequent to step S405 is the same as that described above, and hence a description thereof is omitted here.

The writing process in Case 4 is executed as described above.

Figure 20:
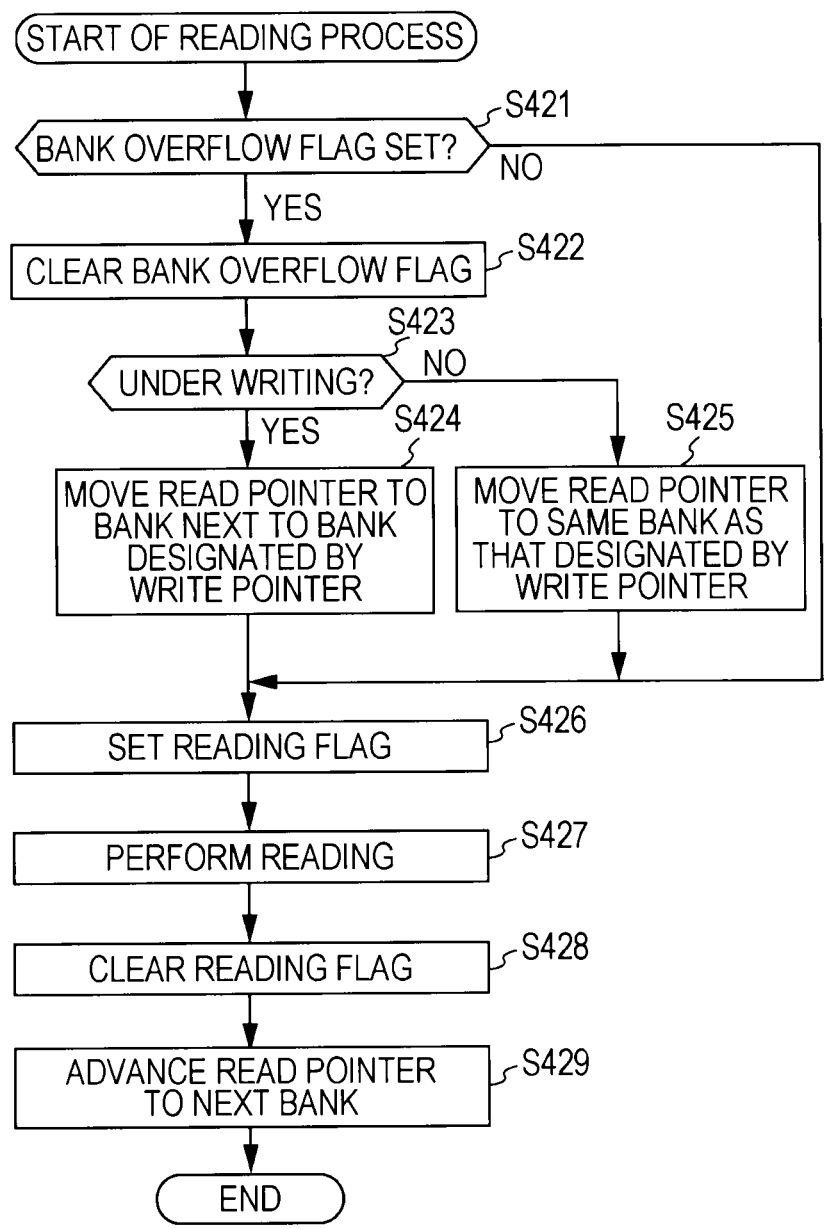
FIG. 20 is a flowchart to explain an example of a read processing flow in Case 4.

Next, a reading process in Case 4 is described with reference to a flowchart of FIG. 20.

Upon the start of the reading process, the bank overflow flag confirming section 223 determines in step S421 whether the bank overflow flag 212 is set. If it is determined that the bank overflow flag 212 is set, the processing advances to step S422.

In step S422, the bank overflow flag setting section 224 clears the bank overflow flag 212 because the bank-full state is eliminated by the processing (reading) that is goring to be executed next. In step S423, the read pointer updating section 222 confirms whether the writing flag 211 is set, thus determining whether the data is under the writing by the write controller 151. If the writing flag 211 is set and the writing of the relevant data is determined as being under the execution, the processing advances to step S424. In step S424, the read pointer updating section 222 moves the location designated by the read pointer 171 to the bank, which is positioned next to the bank designated by the write pointer 162. That processing is to, as described above, reduce the number of discarded precincts with a simple manner.

After the read pointer 171 has been updated, the reading flag setting section 225 sets the reading flag 231 in step S426, thus indicating that the reading process is under the execution. In step S427, the reading section 226 reads the precinct attribute information from the bank designated by the read pointer 171. Also, the reading section 226 reads the precinct data by using the write address 161, which is added to the precinct attribute information having been read. After the reading of the data, the reading flag setting section 225 clears the reading flag 231 in step S428. Further, the location designated by the read pointer 171 is advanced to the next bank in step S429, whereby the reading process is brought to an end.

If it is determined in step S423 that the data is not under the writing, the processing advances to step S425. In step S425, the read pointer updating section 222 moves the location designated by the read pointer 171 to the bank designated by the write pointer 162.

In Case 4, the write pointer 162 is updated after the writing as in Case 3. Also in Case 4, therefore, the data in the bank designated by the write pointer 162 is the oldest among the data stored in all the banks. Hence, the read controller 154 can further reduce the number of discarded precincts by reading the data in the bank designated by the write pointer 162 (step S425) if the processing is not under the writing.

Stated another way, the write controller 151 confirms in step S423 whether the processing is under the writing, and controls the destination of movement of the location designated by the read pointer 171 depending on the confirmation result. As a result, the write controller 151 can further reduce the number of discarded precincts.

After the end of the processing in step S425, the processing advances to step S426. The processing subsequent to step S426 is the same as that described above, and hence a description thereof is omitted here.

If it is determined in step S421 that the bank overflow flag 212 is not set, the processing advances to step S426. In this case, because the bank-full state is not generated, the reading of the data is performed without updating the read pointer 171. The processing subsequent to step S426 is the same as that described above, and hence a description thereof is omitted here.

The reading process in Case 4 is executed as described above. By controlling the writing and the reading of data as described above, the input/output control of the buffer can also be more appropriately performed in Case 4. As a result, the influence upon the decoded image can be further reduced even when the bank-full state is generated.

The relationship between the reading and the writing with the above-described input/output control will be described below with reference to FIGS. 21 to 23. The following description is made for Case 2.

Figure 21:
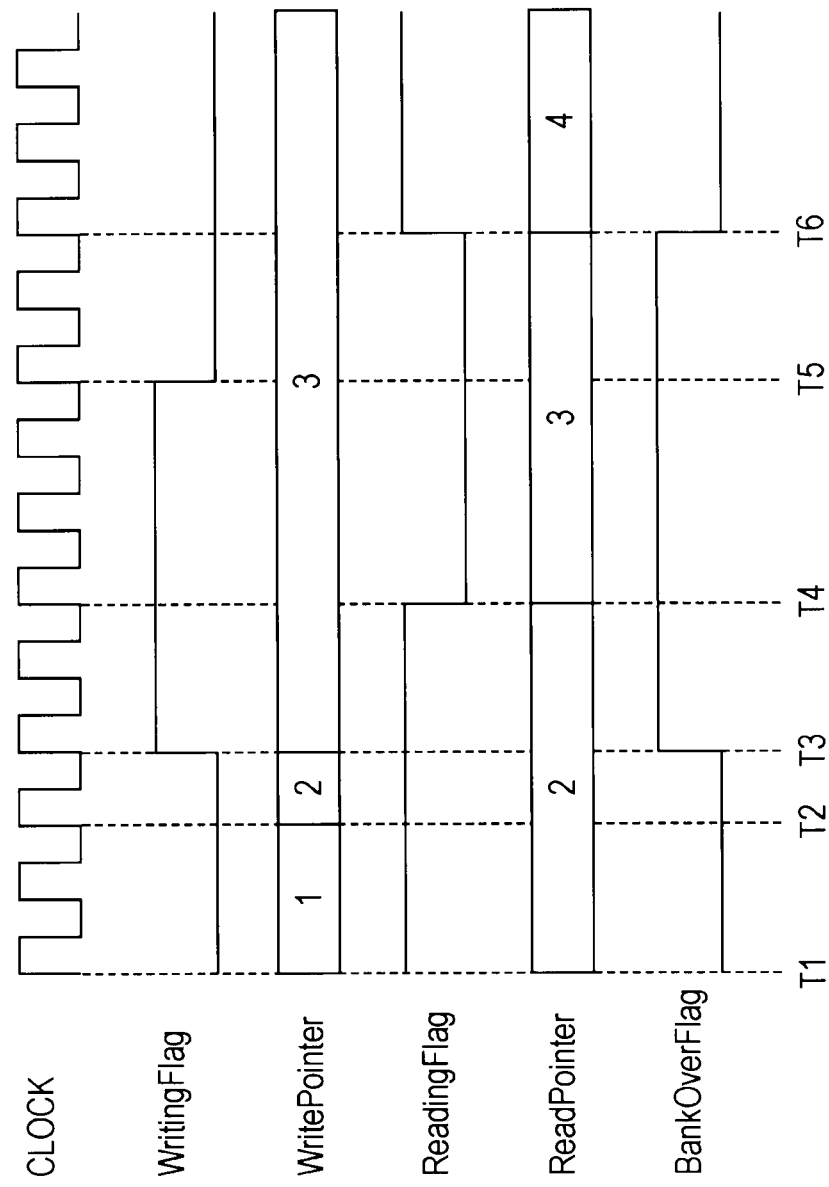
FIG. 21 is a timing chart to explain an example of changes of individual parameters in Case 2 when a bank-full state is generated during reading.

FIG. 21 is a timing chart to explain an example of changes of individual parameters when the bank-full state is generated during the reading in Case 2. Note that, in FIG. 21, the time sequence advances from the left to the right.

The uppermost row in FIG. 21 represents the waveform of a clock signal (CLOCK). As illustrated in FIG. 21, the clock signal is a binary signal, which has a value "1" at an upper level and a value "0" at a lower level in the chart. The second uppermost row in FIG. 21 represents changes in a value of the writing flag (WritingFlag) 211 as a waveform (stepwise line). As illustrated in FIG. 21, the writing flag 211 is a binary parameter, which has a value "1" at an upper level and a value "0" at a lower level in the chart. The third uppermost row in FIG. 21 represents changes in a value of the write pointer (WritePointer) 162 as a numerical value. The numerical value put in the row of the write pointer 162 indicates the ID information of the bank designated by the write pointer 162. Thus, a point at which the numerical value is changed represents the timing when the write pointer 162 is updated.

The fourth uppermost row in FIG. 21 represents changes in a value of the reading flag (ReadingFlag) 231 as a waveform (stepwise line). As illustrated in FIG. 21, the reading flag 231 is a binary parameter, which has a value "1" at an upper level and a value "0" at a lower level in the chart. The fifth uppermost row in FIG. 21 represents changes in a value of the read pointer (ReadPointer) 171 as a numerical value. The numerical value put in the row of the read pointer 171 indicates the ID information of the bank designated by the read pointer 171. Thus, a point at which the numerical value is changed represents the timing when the read pointer 171 is updated.

The lowermost row in FIG. 21 represents changes in a value of the bank overflow flag (BankOverFlag) 212 as a waveform (stepwise line). As illustrated in FIG. 21, the bank overflow flag 212 is a binary parameter, which has a value "1" at an upper level and a value "0" at a lower level in the chart.

At a time T1 in FIG. 21, the write controller 151 is not executing the writing. However, the read controller 154 is reading the data from the bank 2. The bank-full state is not generated.

At a time T2, the location designated by the write pointer 162 is updated to the bank 2 prior to the writing. At this point in time, the location designated by the write pointer 162 and the location designated by the read pointer 171 are matched with each other. It is, therefore, confirmed based on the value of the reading flag 231 that the data in the bank 2 is under the reading. Because of the confirmation that the data in the bank 2 is under the reading, the location designated by the write pointer 162 is further updated to the bank 3 at a time T3, and the bank overflow flag 212 and the writing flag 211 are both set. The writing into the bank 3 is then started.

When the reading is completed at a time T4, the reading flag 231 is cleared and the location designated by the read pointer 171 is updated to the next bank (bank 3). However, the bank-full state still continues and the bank overflow flag 212 remains set. Even after the writing is completed and the writing flag 211 is cleared at a time T5, the bank-full state still continues and the bank overflow flag 212 remains set. Because the write pointer 162 is updated at the start of the writing, it is not updated at the time T5.

When the reading process is started at a time T6, the bank overflow flag 212 is cleared and the location designated by the read pointer 171 is moved to the bank (bank 4), which is positioned next to the bank at the location designated by the write pointer 162. The reading of the data from the bank is then started from the bank 4.

By executing control in such a manner, even when the bank-full state is generated, the sending buffer 113 can transmit data while only the data in the bank 3 is discarded. In other words, the sending apparatus 101 can more appropriately execute the input/output control of the buffer. As a result, the sending apparatus 101 can further reduce the influence upon the decoded image even when the bank-full state is generated.

Figure 22:
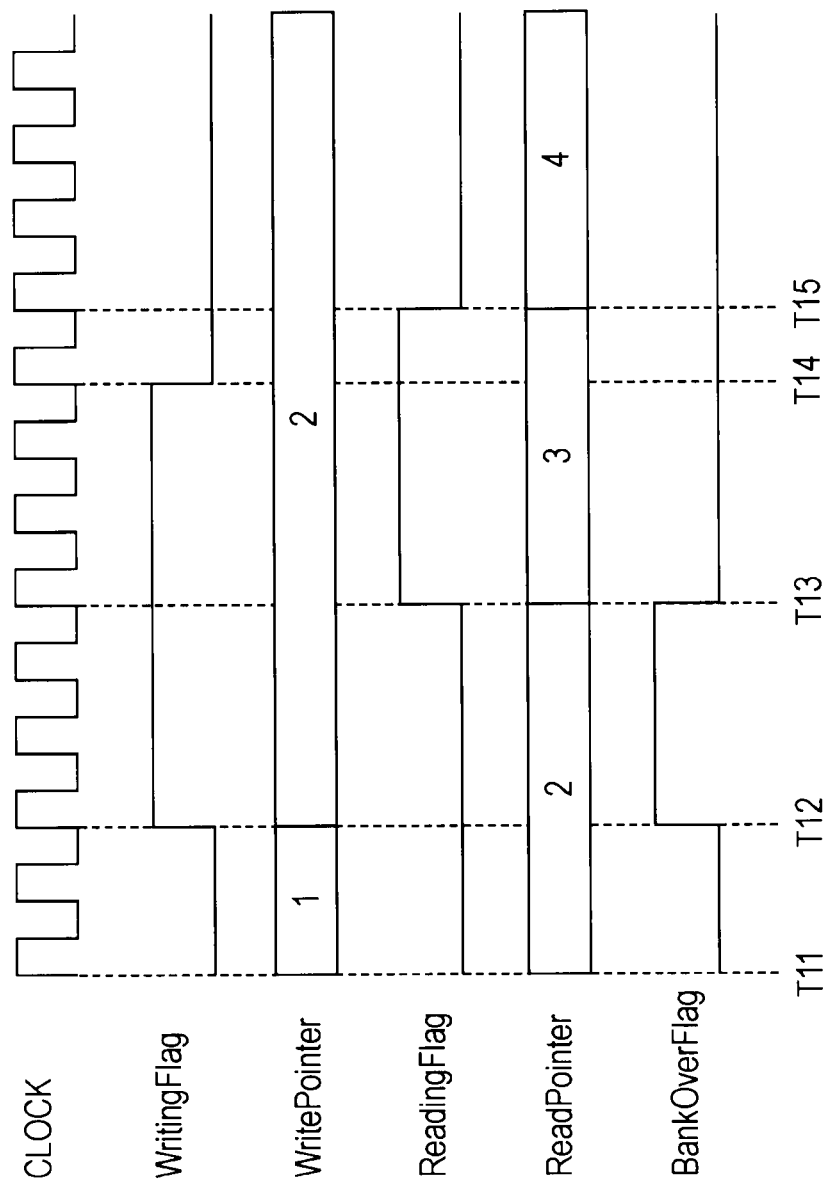
FIG. 22 is a timing chart to explain an example of changes of the individual parameters in Case 2 when the bank-full state is generated at a time other than during reading.

FIG. 22 is a timing chart to explain an example of changes of the individual parameters in Case 2 when the bank-full state is generated at a time other than during reading. The configuration of the timing chart of FIG. 22 is basically similar to that of FIG. 21.

At a time T11 in FIG. 22, the write controller 151 is not executing the writing, and the read controller 154 is not executing the reading. Further, the bank-full state is not generated.

When the writing process is started at a time T12, the location designated by the write pointer 162 is updated from the bank 1 to the bank 2. Because the bank 2 is not under the reading, the writing flag 211 is set and the writing into the bank 2 is started. Also, at this point in time, the location designated by the write pointer 162 and the location designated by the read pointer 171 are matched with each other, whereupon the bank-full state is generated. Hence, the bank overflow flag 212 is set.

When the reading process is started at a time T13, the bank overflow flag 212 is cleared and the location designated by the read pointer 171 is updated to the bank (bank 3), which is positioned next to the bank (bank 2) at the location designated by the write pointer 162. Further, the reading flag 231 is set and the reading of the data from the bank 3 is started.

At a time T14, the writing is completed and the writing flag 211 is cleared. At this point in time, the reading flag 231 and the read pointer 171 are not updated. Further, the bank overflow flag 212 is not set.

At a time T15, the reading is completed and the reading flag 231 is cleared. Further, the location designated by the read pointer 171 is moved to the bank (bank 4), which is positioned next to the bank (bank 3) at the location currently designated.

By executing control in such a manner, even when the bank-full state is generated, the sending buffer 113 can transmit data without discarding the data in the bank 3. In other words, the sending apparatus 101 can more appropriately execute the input/output control of the buffer. As a result, the sending apparatus 101 can further reduce the influence upon the decoded image even when the bank-full state is generated.

Figure 23:
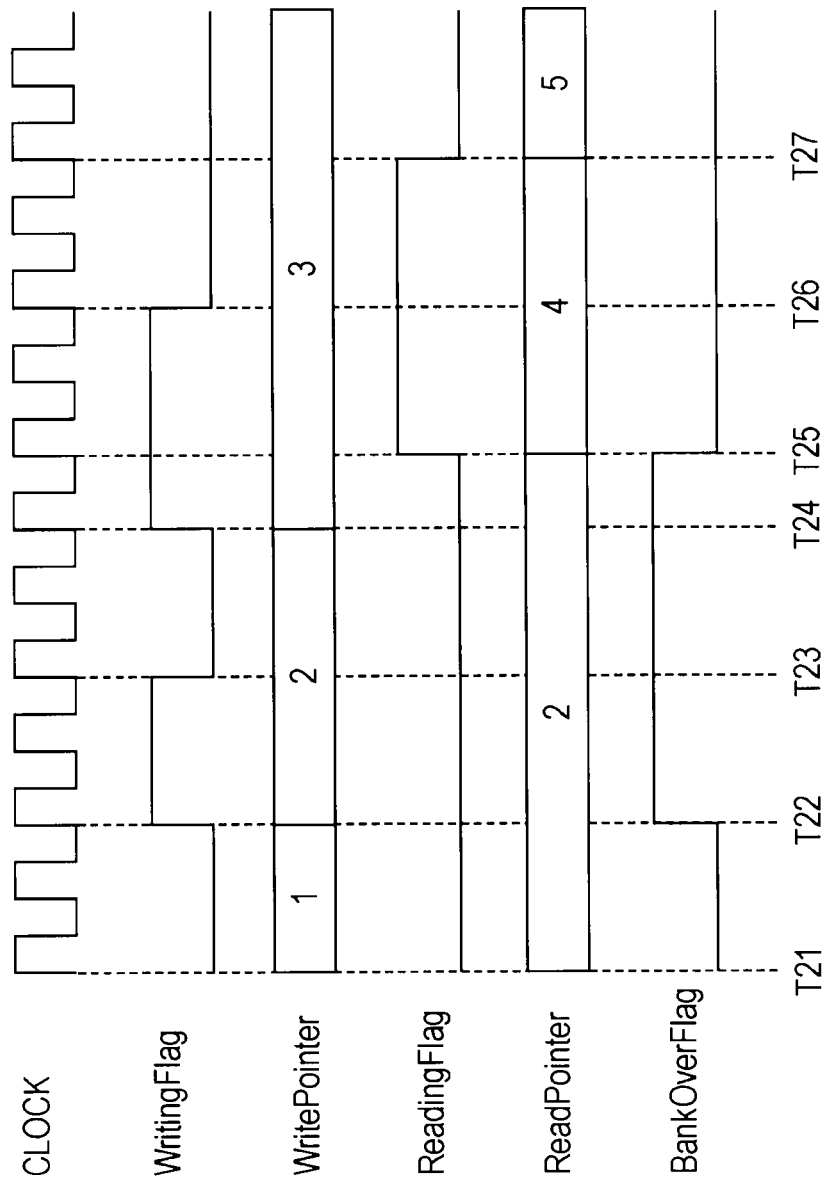
FIG. 23 is a timing chart to explain an example of changes of the individual parameters in Case 2 when writing is executed for a plurality of banks during the bank-full state.

FIG. 23 is a timing chart to explain an example of changes of the individual parameters in Case 2 when writing is executed for a plurality of banks during the bank-full state. The configuration of the timing chart of FIG. 23 is basically similar to that of FIG. 22.

At a time T21 in FIG. 23, the write controller 151 is not executing the writing, and the read controller 154 is not executing the reading. Further, the bank-full state is not generated.

When the writing process is started at a time T22, the location designated by the write pointer 162 is updated from the bank 1 to the bank 2. Because the bank 2 is not under the reading, the writing flag 211 is set and the writing into the bank 2 is started. Also, at this point in time, the location designated by the write pointer 162 and the location designated by the read pointer 171 are matched with each other, whereupon the bank-full state is generated. Hence, the bank overflow flag 212 is set.

When the writing is completed at a time T23, the writing flag 211 is cleared. When the writing process is started again at a time T24, the location designated by the write pointer 162 is updated from the bank 2 to the bank 3. Further, the writing flag 211 is set and the writing into the bank 3 is started. The bank overflow flag 212 is already set.

When the reading process is started at a time T25, the location designated by the read pointer 171 is updated from the bank 2 to the bank (bank 4), which is positioned next to the bank (bank 3) at the location designated by the write pointer 162. Further, the reading flag 231 is set and the reading of the data from the bank 4 is started. In addition, the bank overflow flag 212 is cleared.

At that time, even if the location designated by the read pointer 171 is updated from the bank 2 to the next bank (bank 3), the data in the bank 3 is not read because the bank 3 is under the writing. Also, even if the writing is already completed at that time, the data in the bank 3 is updated to the data in the latest precinct. Accordingly, the read controller 154 can further reduce the influence upon the decoded image by, as described above, updating the location designated by the read pointer 171 to the bank (bank 4) which is positioned next to the bank at the location designated by the write pointer 162.

At a time T26, the writing is completed and the writing flag 211 is cleared. At a time T27, the reading is completed and the reading flag 231 is cleared. Also, at the time T27, the location designated by the read pointer 171 is updated to the next bank (bank 5).

By executing control in such a manner, even when the writing is performed plural time during the bank-full state, the sending buffer 113 can transmit data without discarding the data in the bank 3. In other words, the sending apparatus 101 can more appropriately execute the input/output control of the buffer. As a result, the sending apparatus 101 can further reduce the influence upon the decoded image even when the bank-full state is generated.

While there are four cases, i.e., Case 1 to Case 4, regarding the update timings of the write pointer 162 and the read pointer 171 as described above, the input/output control can be executed based on an arbitrarily selected one of the four cases so long as it is preset. Be it, however, noted that, as seen from the above description with reference to FIGS. 13 to 20, Case 1 or 2 is easier to execute the input/output control than Case 3 or 4. Further, in Case 2, the update timings of the write pointer 162 and the read pointer 171 differ from each other. Accordingly, Case 2 has a lower possibility than Case 1 in that the location designated by the write pointer and the location designated by the read pointer are matched with each other and that the reading process is under the execution. As a result, Case 2 can reduce the number of times of updates of the write pointer (steps S104 and S204) and can be more easily processed in comparison with Case 1. In addition, the reading process is also easier to execute in Case 2.

For the reasons described above, Case 2 is desirably employed in order to more easily and more appropriately execute the input/output control of the buffer.

Conceivable concrete examples of an information processing system 100 (transmission system) using the low-delay codec, to which the embodiment of the present invention is applied, are described below.

One exemplary system is to transmit videos taken by a relay camera to a broadcasting station. The transmission path 102 may be wired or wireless. Another example is a video-conference system.

Further, the embodiment of the present invention can be applied to a system for displaying user's interactive operations on a screen in real time, i.e., a real-time compression and transmission system. Conceivable examples of such a system include a TV video transmission system in which a tuner and a display are separate from each other, and a wireless video transmission system between a video accumulator (e.g., an HDD recorder) and a display (e.g., a TV) in a home network.

The above-described series of processes can be executed by using hardware or software. For example, a personal computer, configured as illustrated in FIG. 24, can be used to execute the above-described series of processes.

Figure 24:
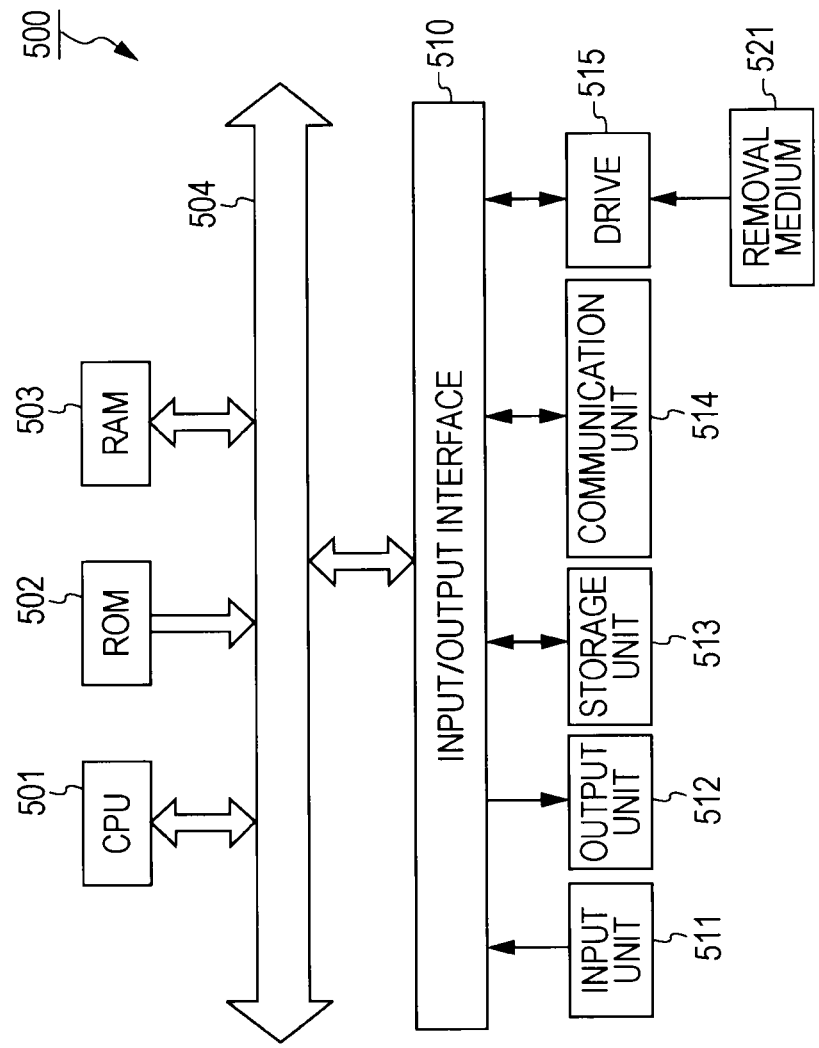
FIG. 24 is a block diagram illustrating an example of configuration of a personal computer in which the present invention is embodied.

Referring to FIG. 24, a CPU (Central Processing Unit) 501 of a personal computer 500 executes various processes in accordance with programs stored in a ROM (Read Only Memory) 502, or programs loaded into a RAM (Random Access Memory) 503 from a storage unit 513. Data, etc. necessary for the CPU 501 to execute the various processes are also stored in the RAM 503 when necessary.

The CPU 501, the ROM 502, and the RAM 503 are interconnected via a bus 504. An input/output interface 510 is also connected to the bus 504.

Connected to the input/output interface 510 are an input unit 511, such as a keyboard and/or a mouse, an output unit 512 including a display, such as a CRT (Cathode Ray Tube) or an LCD (Liquid Crystal Display), and a speaker, a storage unit 513 in the form of, e.g., a hard disk, and a communication unit 514 in the form of, e.g., a modem. The communication unit 514 executes a communication process via a network including the Internet.

Further, a drive 515 is connected, if necessary, to the input/output interface 510. A removable medium 521, such as a magnetic disc, an optical disc, a magneto-optical disc, or a semiconductor memory, is loaded into the drive 515 and a computer program read from the loaded removable medium 521 is installed into the storage unit 513, when necessary.

When the above-described series of processes is executed by using software, programs constituting the software are installed from a network or a recording medium.

For example, the recording medium is provided, as illustrated in FIG. 24, as the removable medium 521, such as a magnetic disc (including a flexible disc), an optical disc (including a CD-ROM (Compact Disc-Read Only Memory) and a DVD (Digital Versatile Disc)), a magneto-optical disc (including an MD (Mini Disc), or a semiconductor memory, which records programs thereon and which is distributed for delivering the programs to users separately from a main unit of the apparatus. In addition, the recording medium can also be provided as the ROM 502 or the hard disk included in the storage unit 513, which records the programs thereon and is delivered to users in a state previously incorporated in the main unit of the apparatus.

The manner of executing the steps explained above in this specification and describing the programs recorded on the recording medium is not limited to the case where the processes are time-serially executed in the sequence mentioned above, and may include the case where the processes are executed in parallel or individually instead of the time-serial sequence.

Moreover, in this specification, the term "system" represents an entire apparatus made up of a plurality of devices.

The configuration having been described above as one apparatus may be divided into a plurality of apparatuses. Conversely, the configurations having been described above as a plurality of apparatuses may be integrated into one apparatus. As a matter of course, other configuration than described above may be added to the configuration of each apparatus. Further, so long as the configuration and/or the operation of the system is substantially the same as a whole, part of the configuration of some one apparatus may be included in the configuration of some other apparatus. Stated another way, embodiments of the present invention are not limited to the above-described ones and can be variously modified without departing from the gist of the present invention.

The present application contains subject matter related to that disclosed in Japanese Priority Patent Application JP filed in the Japan Patent Office on Sep. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
bank overflow flag confirming means for confirming whether a bank overflow flag is set, the bank overflow flag notifying occurrence of a bank-full state where, in a storage area including a plurality of banks formed therein to store data, not-yet-read data is stored in all the banks;
read pointer control means for, when the bank overflow flag confirming means confirms that the bank overflow flag is set, moving a location designated by a read pointer cyclically designating each of the banks of the storage area as a bank, from which the data is to be read, to a bank positioned next to a bank at a location designated by a write pointer cyclically designating each of the banks of the storage area as a bank, into which the data is to be written; and
reading means for reading the data from the bank designated by the read pointer after the location designated by the read pointer has been updated by the read pointer control means, the reading means including a packet generator that generates an attribute header for a packet from precinct attribute information that specifies a position of a precinct, that includes the data, within an image, a size of the data in the precinct, and quantization parameters used to encode the data in the image.

2. The information processing apparatus according to claim 1, further comprising:
- storage means including the storage area and storing the data in each of the banks;
- write pointer control means for controlling the write pointer;
- writing means for writing the data into the bank designated by the write pointer which is controlled by the write pointer control means; and
- bank overflow flag setting means for setting the bank overflow flag when the not-yet-read data is stored in all the banks of the storage means.

3. The information processing apparatus according to claim 2, wherein when the write pointer control means updates the write pointer, the write pointer control means defines the location designated by the write pointer such that the bank under the reading by the reading means is not designated.

4. The information processing apparatus according to claim 2, further comprising:
- bank overflow flag clearing means for clearing the bank overflow flag set by the bank overflow flag setting means, the setting of the bank overflow flag being confirmed by the bank overflow flag confirming means.

5. The information processing apparatus according to claim 2, wherein the write pointer control means updates the write pointer before the writing performed by the writing means, and
wherein the read pointer control means updates the read pointer after the reading performed by the reading means.

6. The information processing apparatus according to claim 2, wherein the write pointer control means updates the write pointer before the writing performed by the writing means, and
wherein the read pointer control means updates the read pointer before the reading performed by the reading means.

7. The information processing apparatus according to claim 2, wherein the write pointer control means updates the write pointer after the writing performed by the writing means, and
wherein the read pointer control means updates the read pointer before the reading performed by the reading means.

8. The information processing apparatus according to claim 2, wherein the write pointer control means updates the write pointer after the writing performed by the writing means, and
wherein the read pointer control means updates the read pointer after the reading performed by the reading means.

9. The information processing apparatus according to claim 2, further comprising:
- writing flag setting means for setting a writing flag indicating the data being under writing during a period in which the writing means is writing the data.

10. The information processing apparatus according to claim 1, further comprising:
- reading flag setting means for setting a reading flag indicating the data being under reading during a period in which the reading means is reading the data.

11. The information processing apparatus according to claim 1, wherein the precinct attribute information indicates attributes of the encoded data per encoding unit at which the image is encoded.

12. The information processing apparatus according to claim 1, wherein the precinct attribute information is added with address information of the storage area in which the encoded data is held.

13. The information processing apparatus according to claim 1, wherein the packet generator prepares the packet based on the encoded data.

14. An information processing method for use in an information processing apparatus, the method comprising the steps of:
- confirming whether a bank overflow flag is set, the bank overflow flag notifying occurrence of a bank-full state where, in a storage area including a plurality of banks formed therein to store data, not-yet-read data is stored in all the banks;
- upon confirming that the bank overflow flag is set, moving a location designated by a read pointer cyclically designating each of the banks of the storage area as a bank, from which the data is to be read, to a bank positioned next to a bank at a location designated by a write pointer cyclically designating each of the banks of the storage area as a bank, into which the data is to be written;
- reading the data from the bank designated by the read pointer after the location designated by the read pointer has been updated; and
- generating an attribute header for a packet from precinct attribute information that specifies a position of a precinct, that includes the data, within an image, a size of the data in the precinct, and quantization parameters used to encode the data in the image.

15. An information processing apparatus comprising:
- a bank overflow flag confirming unit configured to confirm whether a bank overflow flag is set, the bank overflow flag notifying occurrence of a bank-full state where, in a storage area including a plurality of banks formed therein to store data, not-yet-read data is stored in all the banks;
- read pointer control unit configured to, when the bank overflow flag confirming unit confirms that the bank overflow flag is set, move a location designated by a read pointer cyclically designating each of the banks of the storage area as a bank, from which the data is to be read, to a bank positioned next to a bank at a location designated by a write pointer cyclically designating each of the banks of the storage area as a bank, into which the data is to be written; and
- a reading unit configured to read the data from the bank designated by the read pointer after the location designated by the read pointer has been updated by the read pointer control unit, the reading unit including a packet generator configured to generate an attribute header for a packet from precinct attribute information that specifies a position of a precinct, that includes the data, within an image, a size of the data in the precinct, and quantization parameters used to encode the data in the image.

* * * * *